(12) United States Patent
Wada

(10) Patent No.: US 6,636,361 B2
(45) Date of Patent: Oct. 21, 2003

(54) ZOOM LENS AND IMAGE DISPLAY APPARATUS USING THE SAME

(75) Inventor: Ken Wada, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 112 days.

(21) Appl. No.: 09/925,890

(22) Filed: Aug. 9, 2001

(65) Prior Publication Data

US 2002/0060858 A1 May 23, 2002

(30) Foreign Application Priority Data

Aug. 11, 2000 (JP) ........................................ 2000-244728

(51) Int. Cl.⁷ ............................ G02B 15/14; G02B 9/00
(52) U.S. Cl. ...................... 359/680; 359/682; 359/649
(58) Field of Search ................................ 359/648, 649, 359/682, 680

(56) References Cited

U.S. PATENT DOCUMENTS 5,416,639 A * 5/1995 Yamanashi .................. 359/683

* cited by examiner

Primary Examiner—David N. Spector
(74) Attorney, Agent, or Firm—Morgan & Finnegan

(57) ABSTRACT

It is an object of this invention to provide a zoom lens capable of projecting an original projection image displayed by a liquid crystal display element onto a screen surface with high optical performance, and an image projection apparatus using the zoom lens. A zoom lens includes a first lens unit having negative refractive power, a second lens unit having positive refractive power, a stop, a third lens unit having negative refractive power, a fourth lens unit having negative refractive power, and a fifth lens unit having positive refractive power, which are sequentially arranged from the enlargement side and having one or a plurality of lenses. When the magnification is to be changed from the wide angle end to the telephoto end, the second, third, and fourth lens units and the stop move.

38 Claims, 16 Drawing Sheets

FIG. 4A WIDE ANGLE END

FIG. 4B TELEPHOTO END

FIG. 10A WIDE ANGLE END

FIG. 10B TELEPHOTO END

FIG. 13A WIDE ANGLE END

FIG. 13B TELEPHOTO END

ZOOM LENS AND IMAGE DISPLAY APPARATUS USING THE SAME

BACKGROUND OF THE INVENTION

1. Field of the Invention

The present invention relates to a zoom lens and an image projection apparatus using it and, more particularly, to an image projection apparatus suited for a projector for enlarging and projecting, for example, image information of a display member onto a screen and an optical device such as a video camera, film camera, or digital camera for forming image information on an image pickup means such as a film or CCD.

The present invention also relates to a compact zoom lens whose pupil matching property is kept good with respect to an illumination system when applied to a projector and which is suited for a high-resolution mobile liquid crystal projector, in particular.

2. Description of the Related Art

Conventionally, various types of liquid crystal projectors (projection apparatuses) have been proposed, which are designed to project images based on display elements such as liquid crystal display elements onto screen surfaces by using the display elements.

Liquid crystal projectors, in particular, have been widely used as apparatuses for projecting images formed by Personal Computers and the like on large screens for conferences, presentations, and the like.

The following have recently been required for such liquid crystal projectors:

In a three-panel projector using three liquid crystal display elements of three colors, i.e., R, G, and B, a mount space for a dichroic prism serving as a color synthesis means for synthesizing chromatic light beams passing through the liquid crystal display elements and an optical element such as a polarizing plate must be located between the liquid crystal display elements and a projection lens, and hence a predetermined back focal length is required.

To minimize the influence of the angle dependence of a color synthesis film used for the color synthesis means or to ensure a good pupil matching property with respect to the illumination system, a so-called telecentric optical system must be used, in which the pupil on the liquid crystal display element (reduction) side is located at infinity.

If characters and the like look double when images (pictures) based on the liquid crystal display elements of three colors are synthesized and projected on the screen, a sense of resolution and quality deteriorate. In order to prevent this, pixels of the respective colors must be properly overlaid on each other throughout the entire screen. For this purpose, color shift (chromatic aberration of magnification) caused by the projection lens must be properly corrected throughout the entire visible region (the lens system must be an apochromat).

In order to prevent a contour portion of a projected image from distorting undesirably, distortion aberration must be corrected to −2% (barrel distortion on the reduction side) or less (if an abrupt change in distortion aberration at the peripheral and intermediate portions of an image remains, the image quality undesirably deteriorates).

In consideration of the mobility of a projector equipped with a compact panel, there are needs for reductions in apparatus size and weight as well needs for increases in the luminance of a screen and the resolution of images.

Conventionally, various types of zoom lenses have been proposed as projection lenses for liquid crystal projectors.

Of these zoom lenses, a retrofocus type zoom lens in which a lens unit having negative refractive power serves as a front lens unit is widely used for optical devices such as video cameras, film cameras, and digital cameras as an image taking lens for wide view angle.

For example, Japanese Patent Publication No. 6-56453 discloses a zoom lens whose overall lens length remains unchanged in magnification changing operation, which is comprised of lens units respectively having negative refractive power, positive refractive power, negative refractive power, negative refractive power, and positive refractive power sequentially arranged from the enlargement side. When the magnification is to be changed from the wide angle end to the telephoto end, the second lens unit moves to the enlargement side, the third lens unit moves to the reduction side, and the fourth lens unit moves to the enlargement side so as to draw a convex locus.

In a one- or three-panel color liquid crystal projector, in particular, which is designed to project a display image based on a liquid crystal display member through a projection lens in enlarging or projecting the display image onto the screen, the following are required for the projection lens:

(A-1) To eliminate the influences of the alignment characteristics of a liquid crystal or the angle dependence of a color synthesis dichroic mirror in synthesizing a plurality of chromatic light beams, a so-called telecentric optical system in which the exit pupil is located at infinity must be used.

(A-2) To ensure a space for the color synthesis element interposed between the display member and the projection lens, the back focus length must be large.

(A-3) The projection lens needs to be small in size and weight and have high optical performance.

In the zoom lens disclosed in Japanese Patent Publication No. 6-56453, since the synthetic refractive power of the first to third lens units is negative, and incident light diverges and strikes the fourth lens unit, the positive refractive power of the subsequent lens units (on the reduction side) including the fourth lens unit needs to be high. For this reason, the asymmetry of the refractive power arrangement unique to a retrofocus lens is undesirably high in terms of aberration correction. It is difficult to realize a sufficiently compact optical system.

In addition, if the zoom lens disclosed in the above reference is applied as a projection lens for a mobile liquid crystal projector, the overall lens system is large. Therefore, a satisfactory result cannot always be obtained.

SUMMARY OF THE INVENTION

It is an object of the present invention to provide a zoom lens suited for a liquid crystal projector, which reduces the size of the overall lens system, properly maintains telecentric conditions throughout the entire magnification change range, properly corrects aberrations accompanying magnification changing operation, and has good optical performance throughout the entire screen, and an image projection apparatus using the zoom lens.

For achieving such object, one aspect of the present invention is a zoom lens comprising:

a first lens unit having negative refractive power, a second lens unit having positive refractive power, a stop, a third lens unit having negative refractive power, a fourth lens unit having negative refractive power, and a fifth lens unit having positive refractive power sequentially arranged from an enlargement side, each of lens units have one or a plurality of lenses, wherein both refractive power on the enlargement side from the stop and refractive power on a reduction side from the stop are positive.

Further aspect of the present invention is a zoom lens comprising:

a first lens unit having negative refractive power;

a second lens unit having positive refractive power;

a third lens unit having negative refractive power;

a fourth lens unit having negative refractive power; and a fifth lens unit having positive refractive power, the first to fifth lens units being sequentially arranged from an enlargement side, wherein said third lens unit moves from a reduction side to the enlargement side when a magnification is changed from a wide angle end to a telephoto end.

Further aspect of the present invention is a zoom lens comprising:

a first lens unit having negative refractive power;

a second lens unit having positive refractive power;

a third lens unit having negative refractive power;

a fourth lens unit having negative refractive power; and a fifth lens unit having positive refractive power, the first to fifth lens units being sequentially arranged from an enlargement side, wherein when a magnification is changed from a wide angle end to a telephoto end, the first and fifth lens units are fixed, all the second, third, and fourth lens units move from a reduction side to the enlargement side, and letting $\beta 2w$ and $\beta 3w$ be imaging magnifications of the second and third lens units at the wide angle end, f5 be a focal length of the fifth lens unit, and fw be a focal length of an overall system at the wide angle end, $0.25 < \beta 2w < 1.0$ $1.0 < \beta 3w < 5.0$ $1.2 < f5/fw < 2.2$ are satisfied.

Further aspect of the present invention is an image projection apparatus comprising:

at least one image display element; and aforementioned zoom lens, which projects an original projection image formed by the image display element onto a projection screen.

Further aspect of the present invention is an optical device for forming image information on image pickup means by using aforementioned zoom lens.

DETAILED DESCRIPTION OF THE PREFERRED EMBODIMENTS

Figure 1:
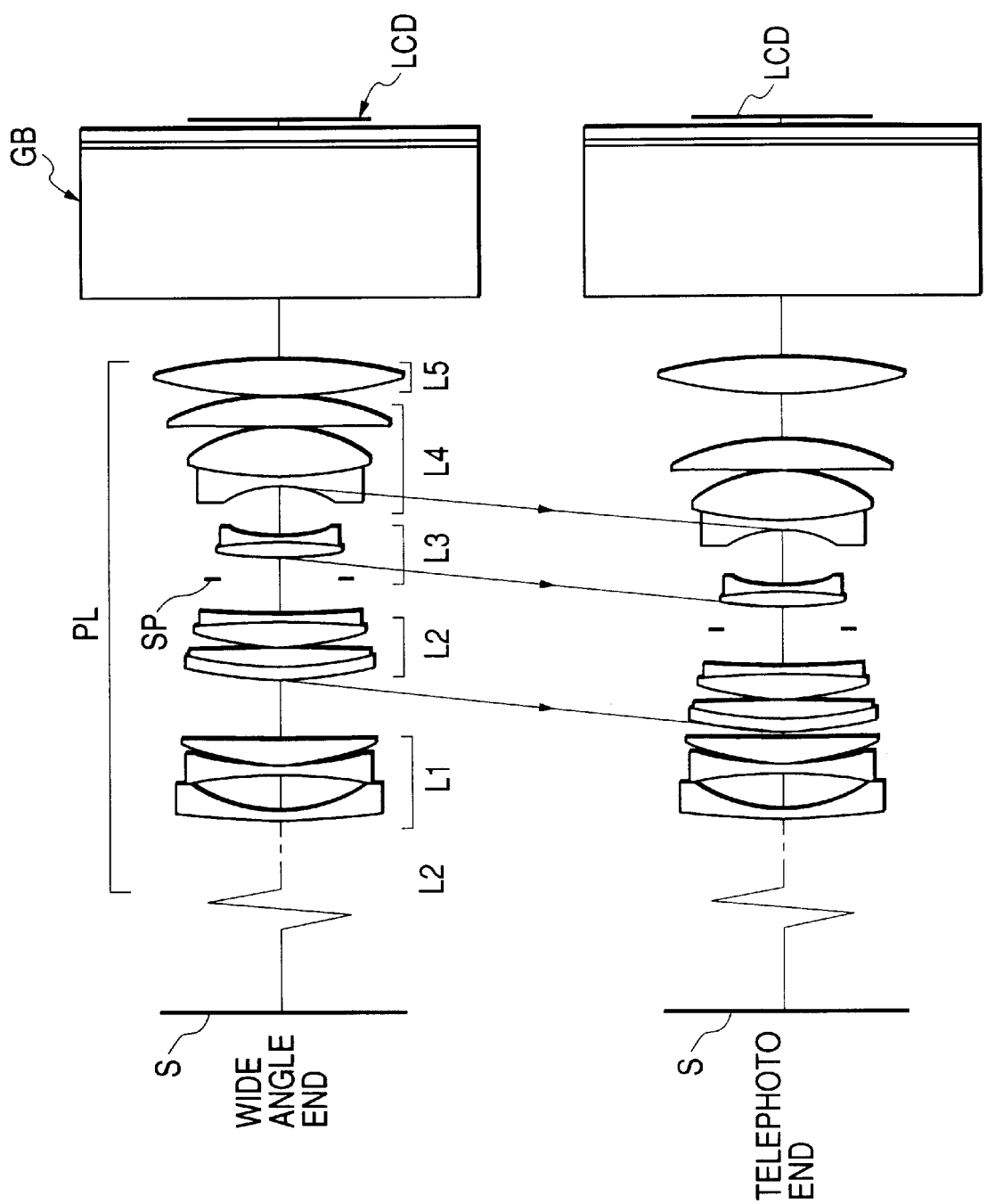
FIGS. 1A and 1B are schematic views showing the main part of an image projection apparatus using a zoom lens according to the first numerical embodiment of the present invention.
Figure 2:
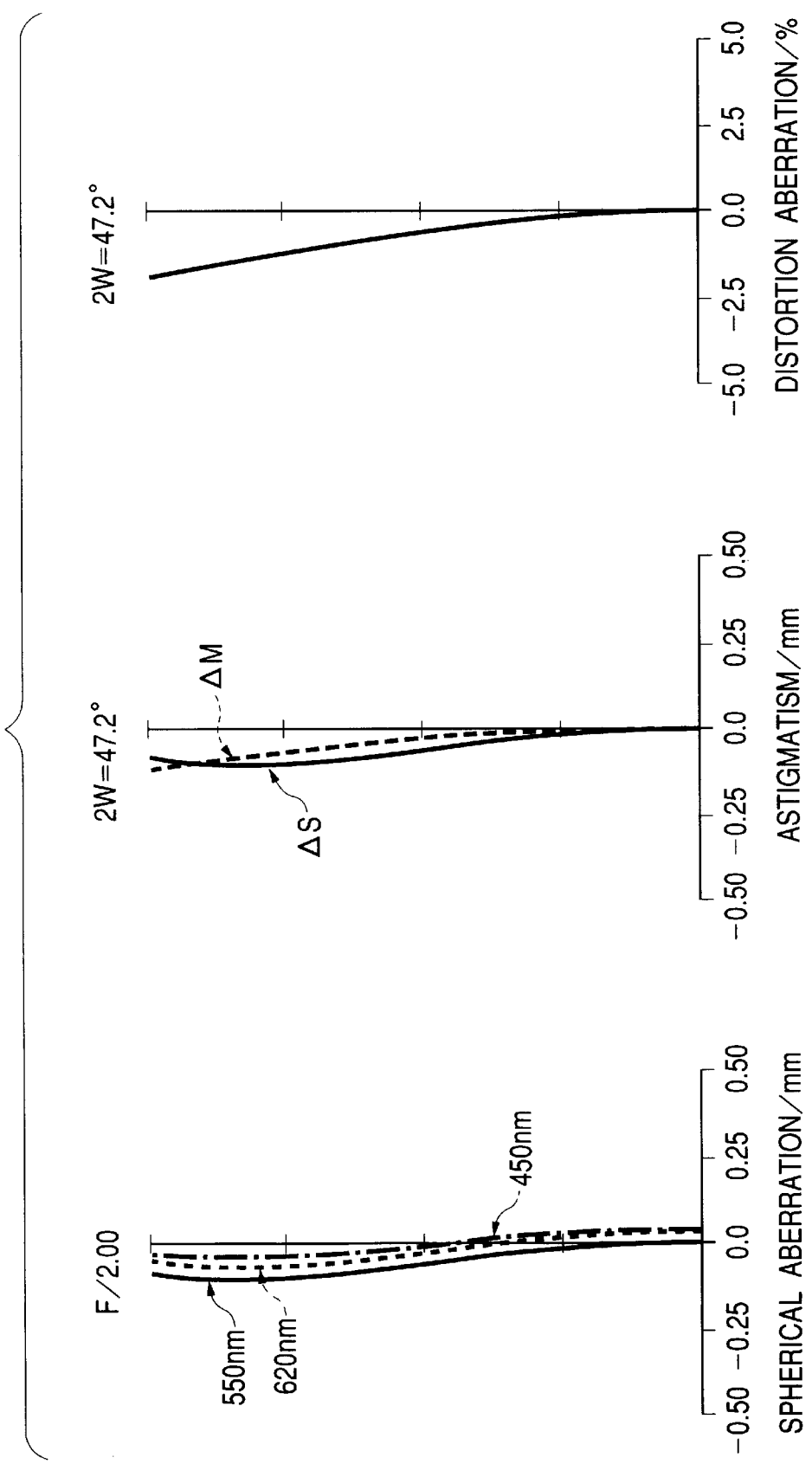
FIG. 2 is an aberration diagram at the wide angle end with an object distance of 2.8 m when the zoom lens of the first numerical embodiment of the present invention is expressed in mm.
Figure 3:
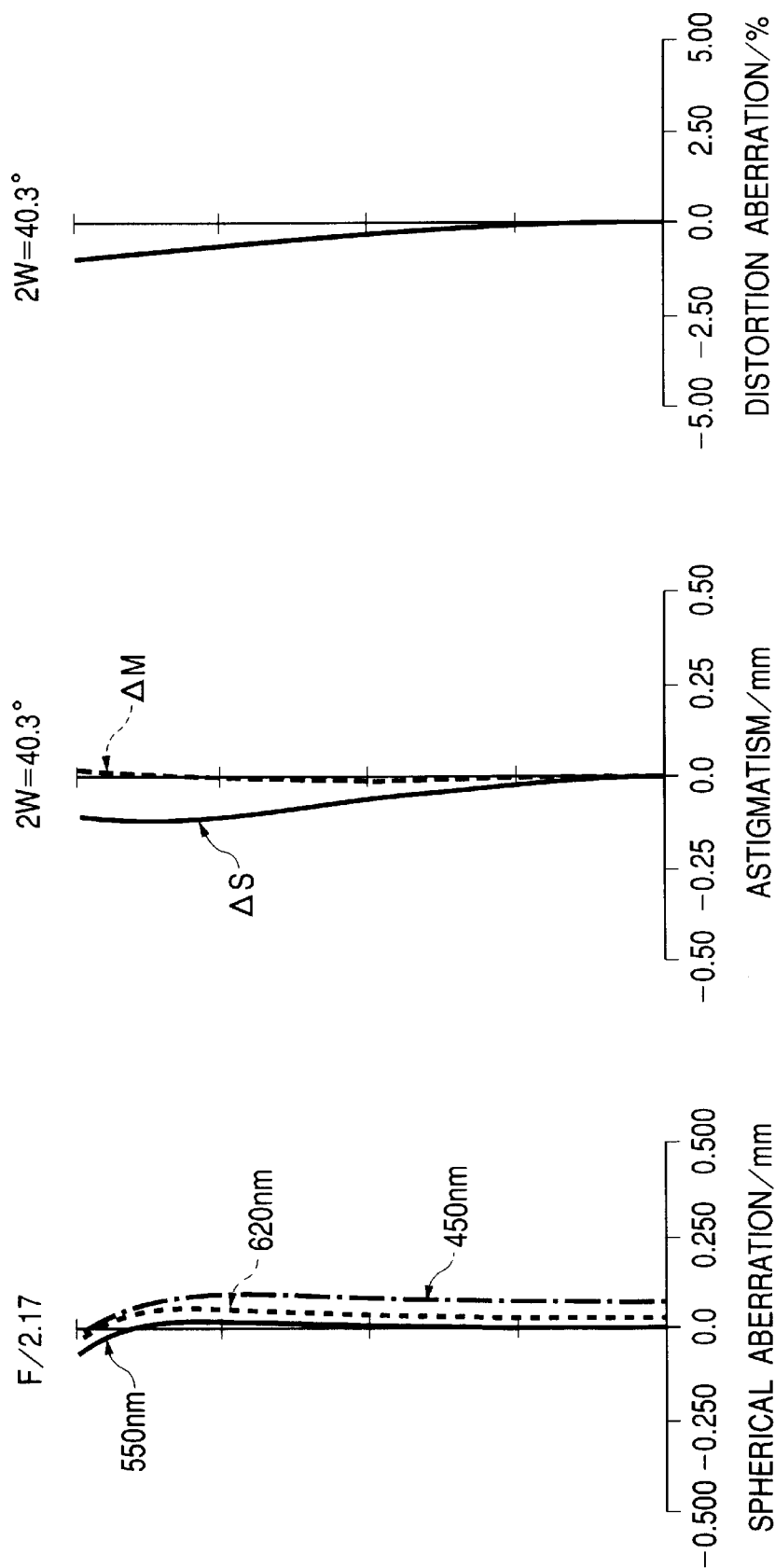
FIG. 3 is an aberration diagram at the telephoto end with an object distance of 2.8 m when the zoom lens of the first numerical embodiment of the present invention is expressed in mm.

FIG. 1 is a schematic view showing the main part of an image projection apparatus (liquid crystal video projector) using a zoom lens according to the first numerical embodiment of the present invention. FIGS. 2 and 3 are aberration diagrams at the wide angle end and telephoto end with an object distance of 2.8 m when the numerical values in the first numerical embodiment (to be described later) of the present invention are expressed in mm.

Figure 4:
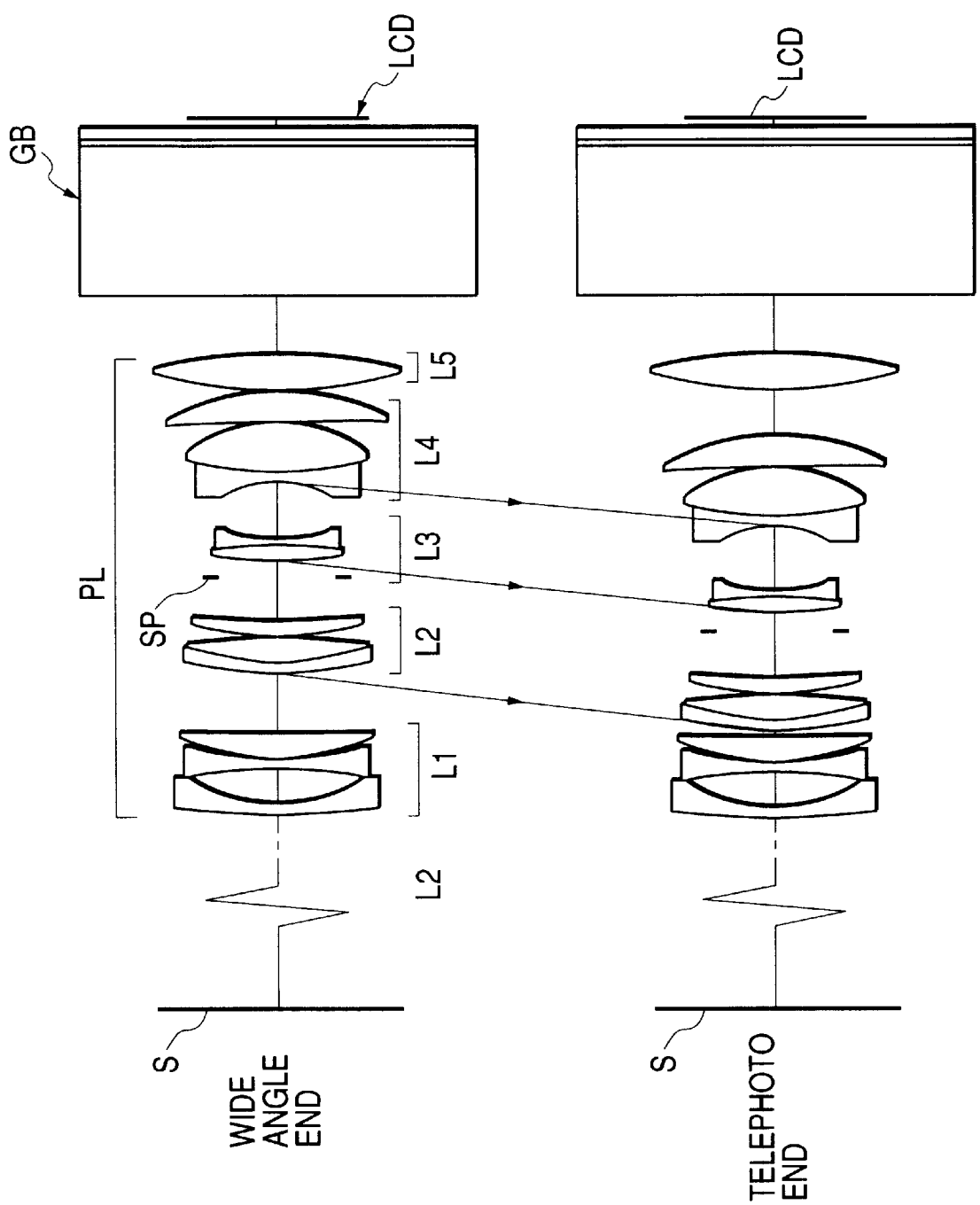
FIGS. 4A and 4B are schematic views showing the main part of an image projection apparatus using a zoom lens according to the second numerical embodiment of the present invention.
Figure 5:
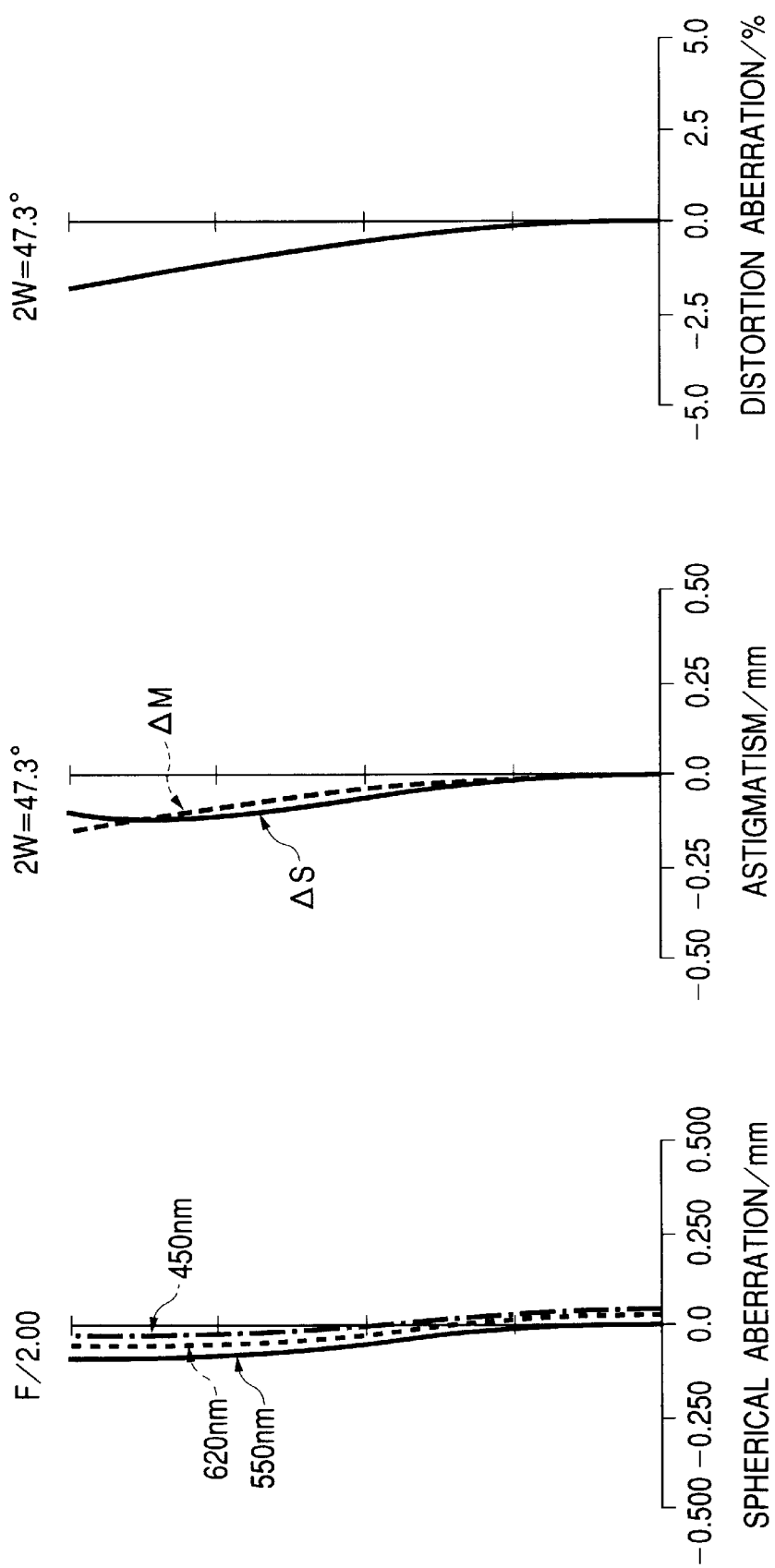
FIG. 5 is an aberration diagram at the wide angle end with an object distance of 2.8 m when the zoom lens of the second numerical embodiment of the present invention is expressed in mm.
Figure 6:
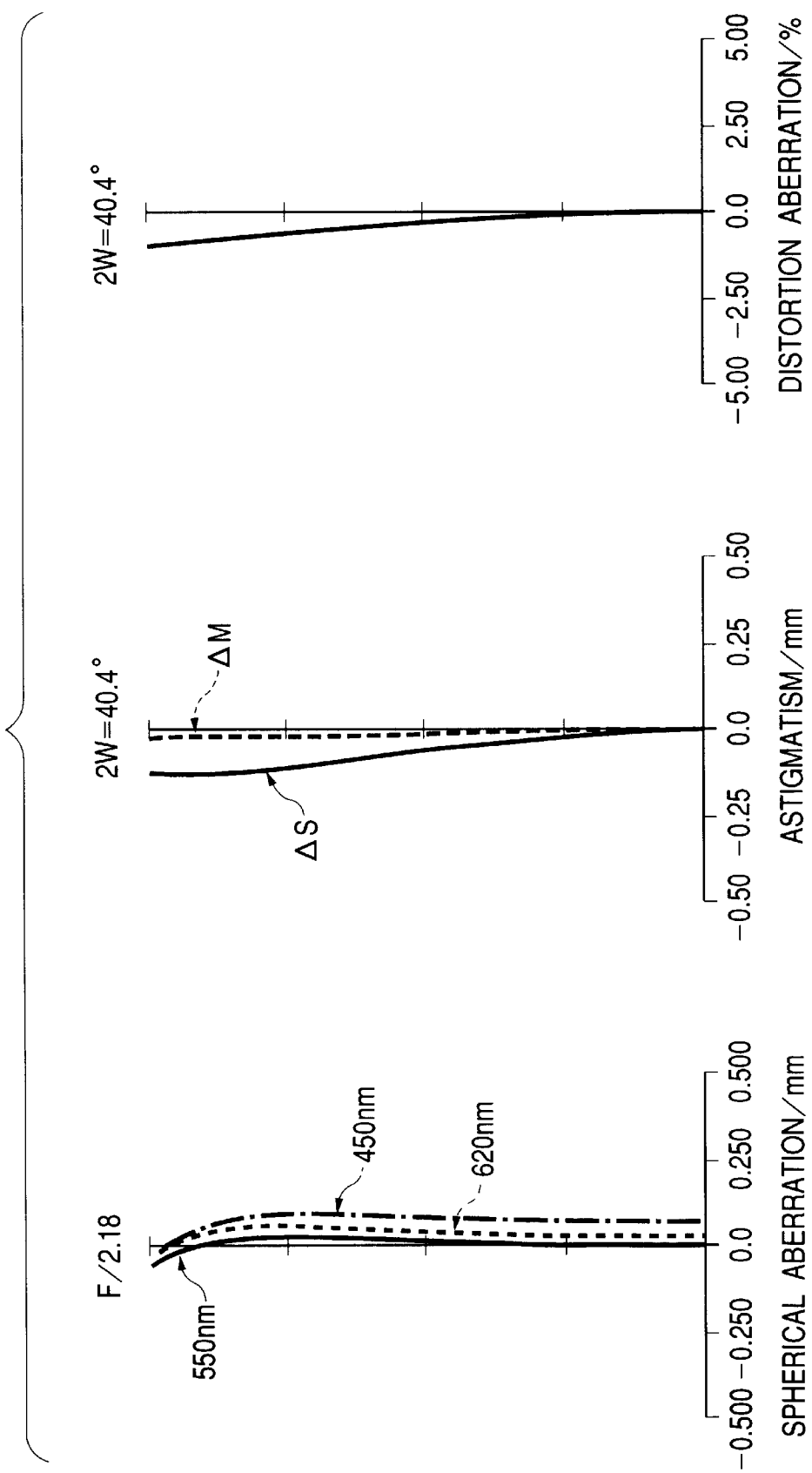
FIG. 6 is an aberration diagram at the telephoto end with an object distance of 2.8 m when the zoom lens of the second numerical embodiment of the present invention is expressed in mm.

FIGS. 4A and 4B are schematic views showing the main part of an image projection apparatus (liquid crystal video projector) using a zoom lens according to the second numerical embodiment of the present invention. FIGS. 5 and 6 are aberration diagrams at the wide angle end and telephoto end with an object distance of 2.8 m when the numerical values in the second numerical embodiment (to be described later) of the present invention are expressed in mm.

Figure 7:
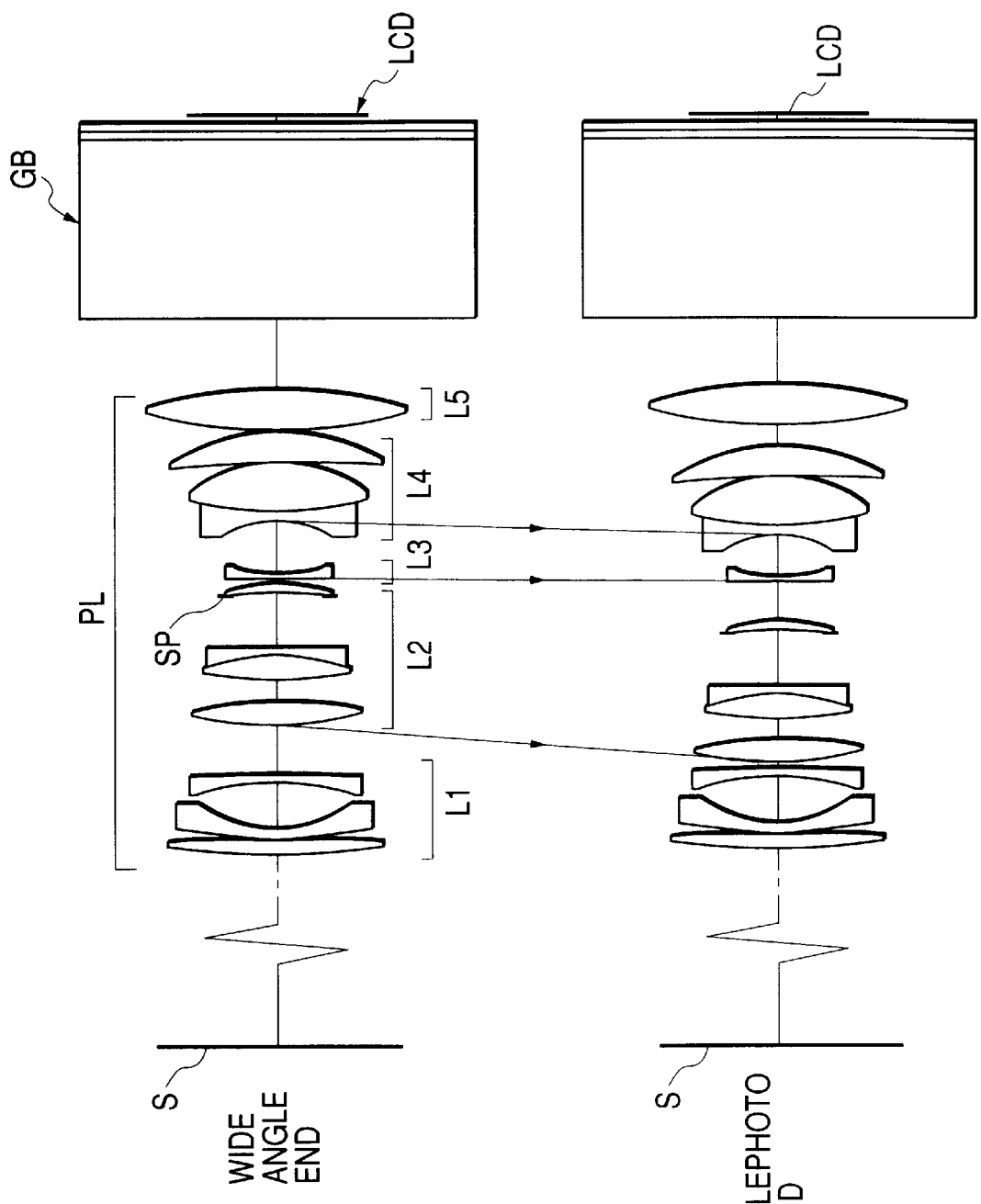
FIGS. 7A and 7B are schematic views showing the main part of an image projection apparatus using a zoom lens according to the third numerical embodiment of the present invention.
Figure 8:
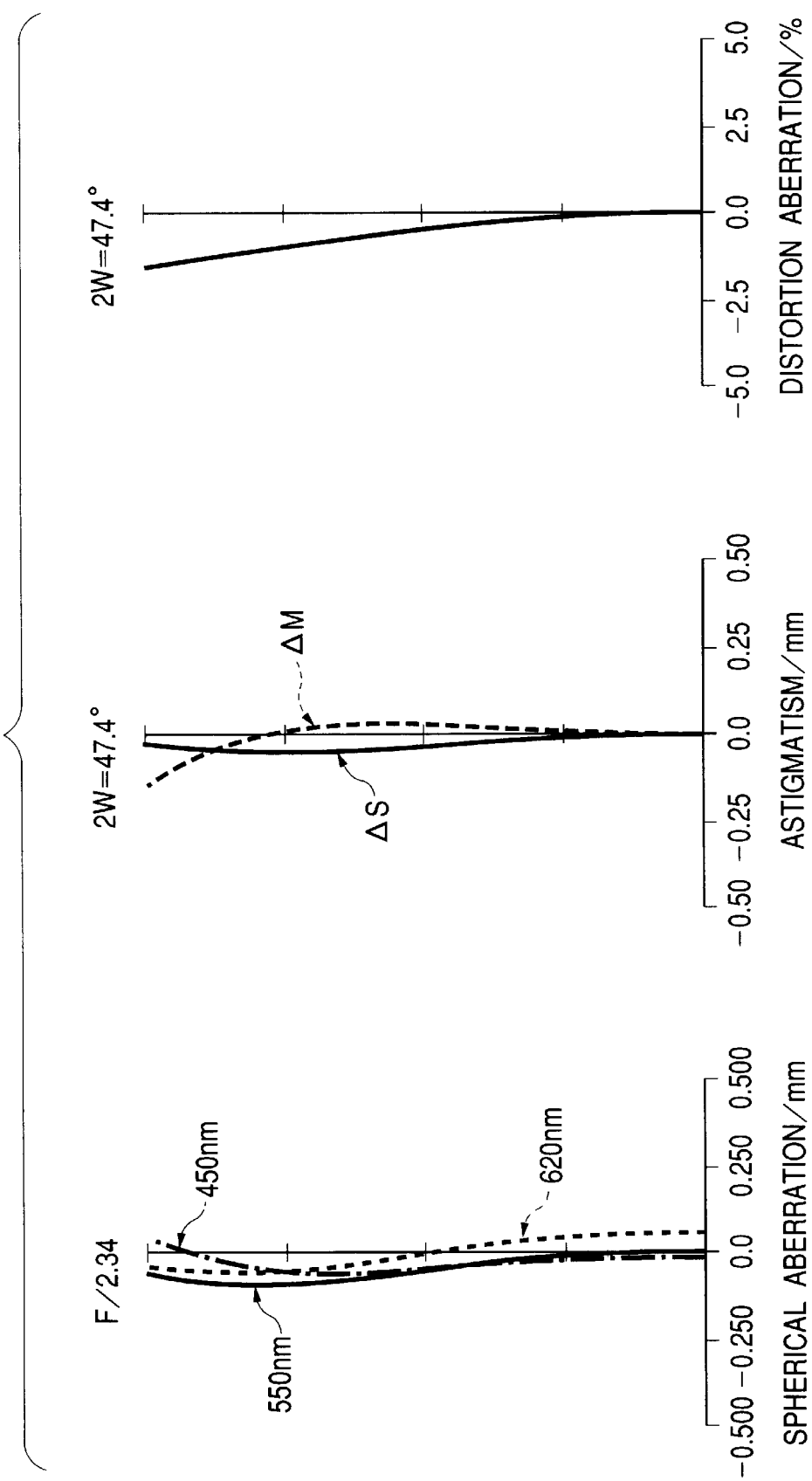
FIG. 8 is an aberration diagram at the wide angle end with an object distance of 2.8 m when the zoom lens of the third numerical embodiment of the present invention is expressed in mm.
Figure 9:
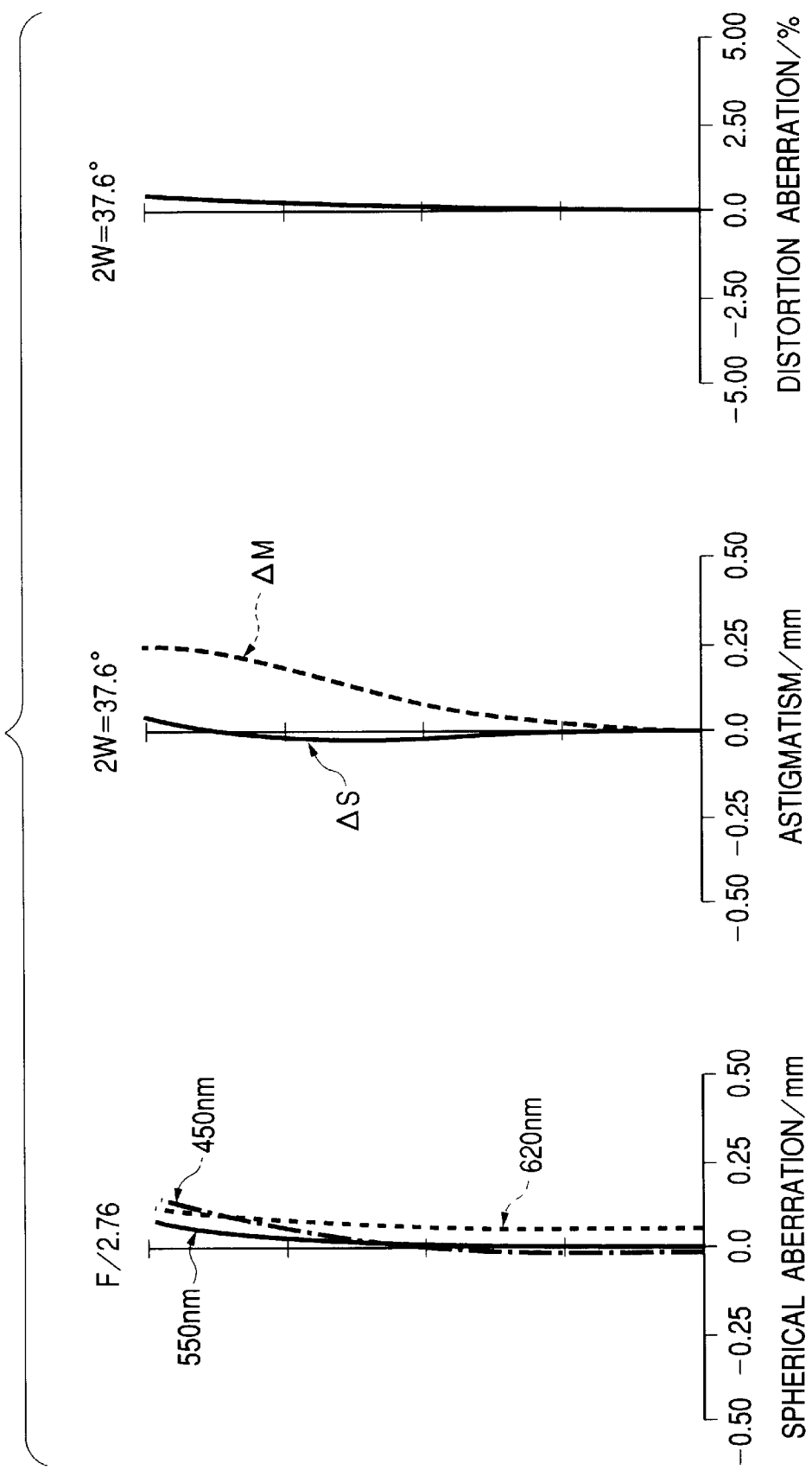
FIG. 9 is an aberration diagram at the telephoto end with an object distance of 2.8 m when the zoom lens of the third numerical embodiment of the present invention is expressed in mm.

FIGS. 7A and 7B are schematic views showing the main part of an image projection apparatus (liquid crystal video projector) using a zoom lens according to the third numerical embodiment of the present invention. FIGS. 8 and 9 are aberration diagrams at the wide angle end and telephoto end with an object distance of 2.8 m when the numerical values in the third numerical embodiment (to be described later) of the present invention are expressed in mm.

Figure 10:
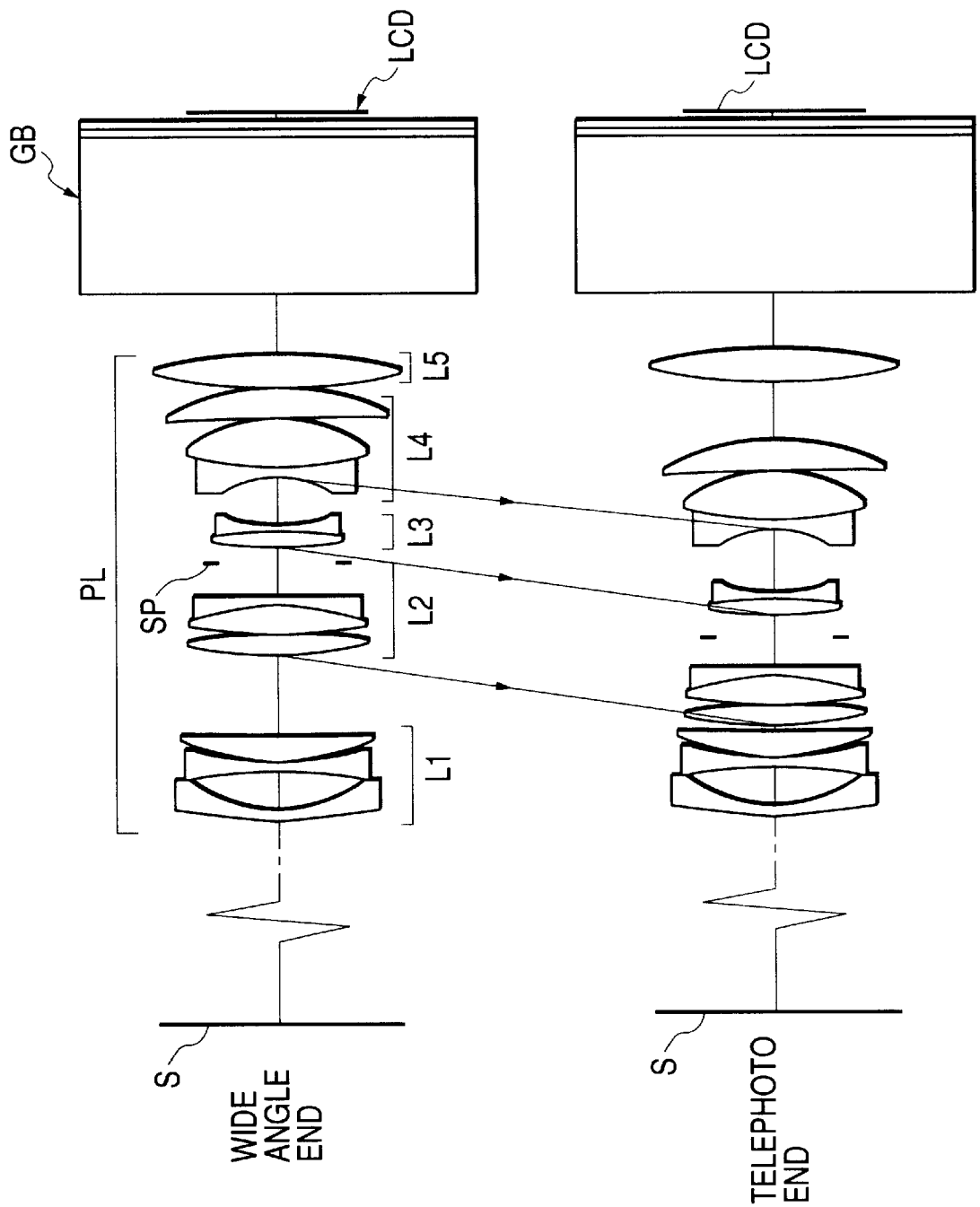
FIGS. 10A and 10B are schematic views showing the main part of an image projection apparatus using a zoom lens according to the fourth numerical embodiment of the present invention.
Figure 11:
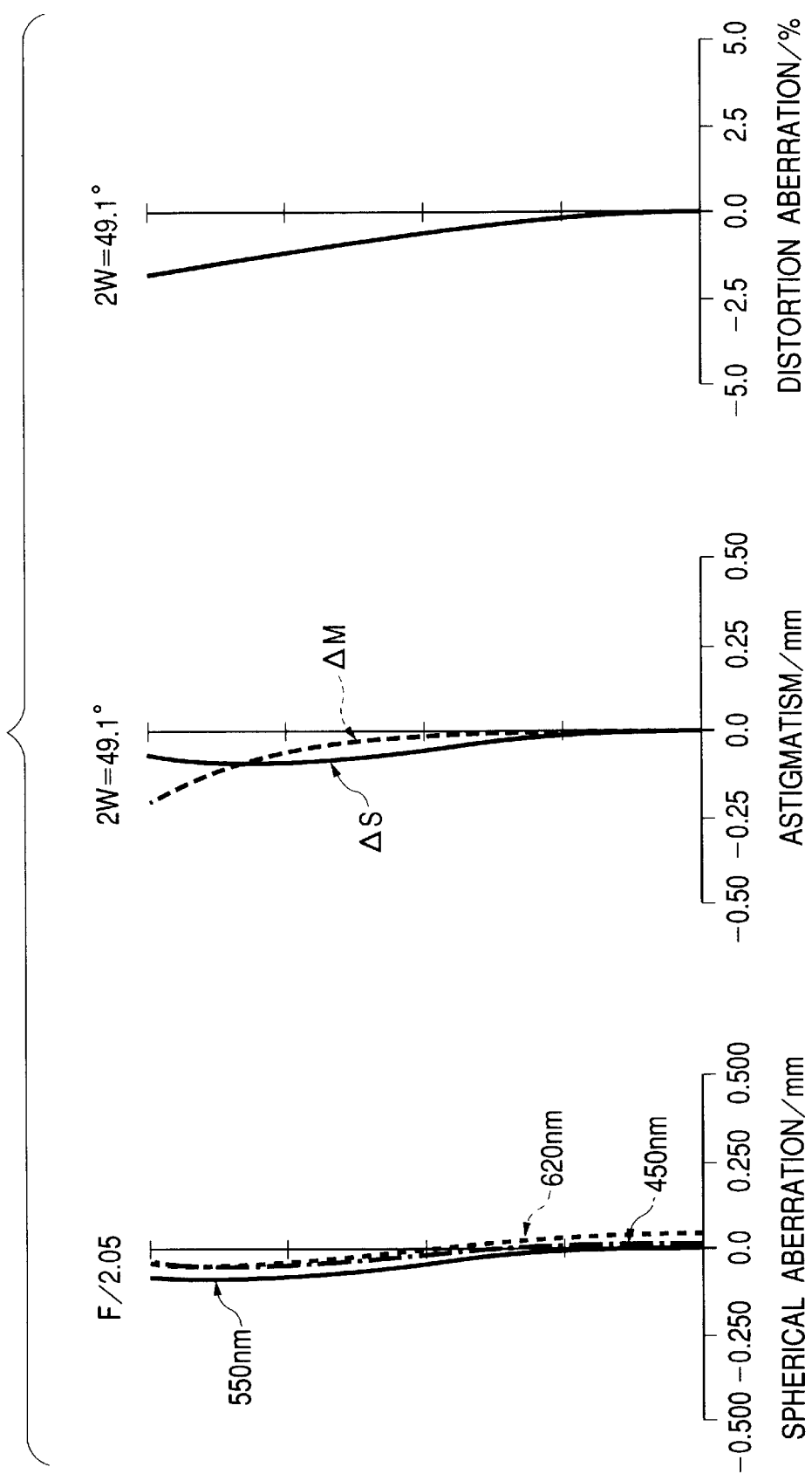
FIG. 11 is an aberration diagram at the wide angle end with an object distance of 2.8 m when the zoom lens of the fourth numerical embodiment of the present invention is expressed in mm.
Figure 12:
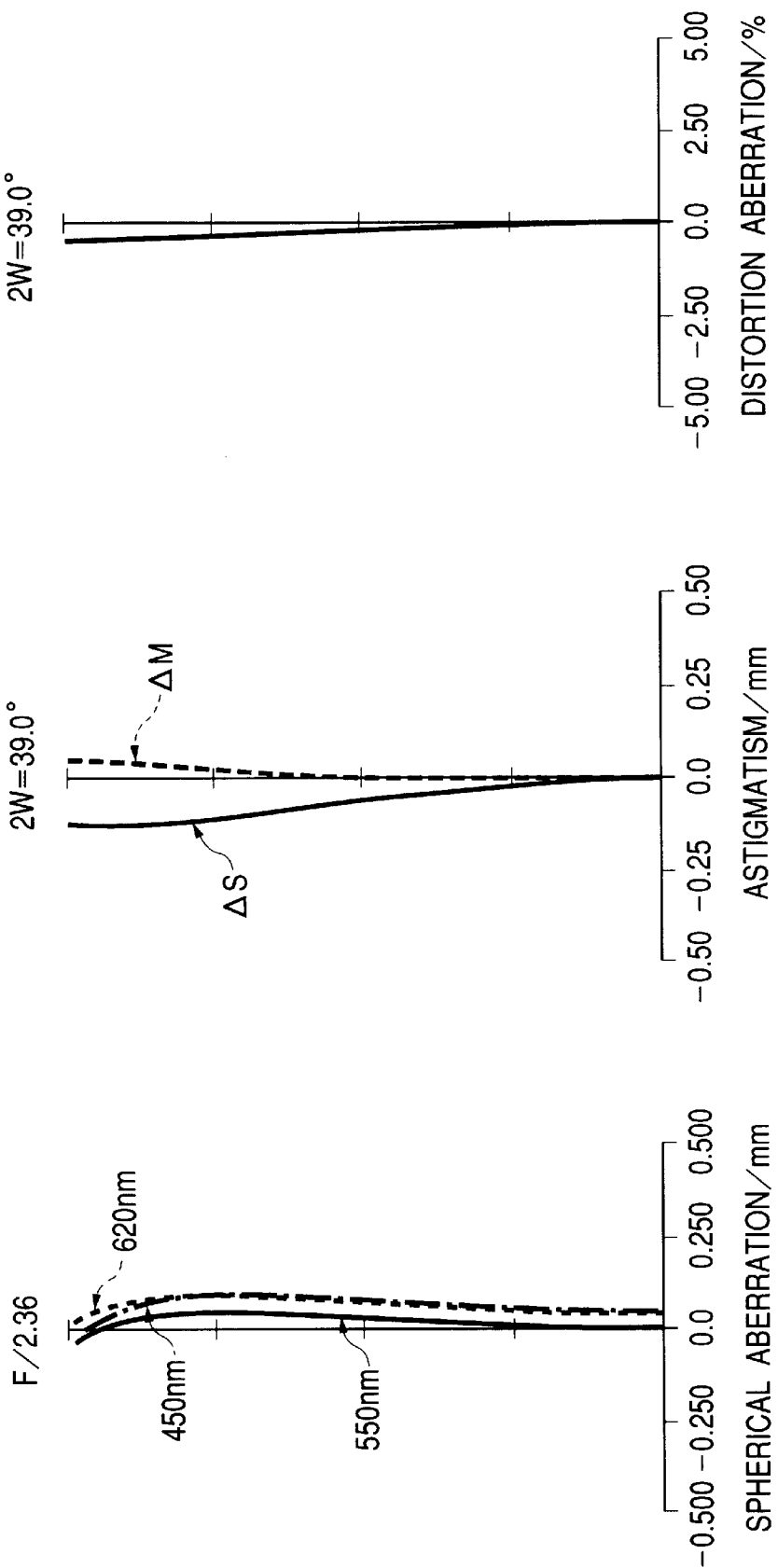
FIG. 12 is an aberration diagram at the telephoto end with an object distance of 2.8 m when the zoom lens of the fourth numerical embodiment of the present invention is expressed in mm.

FIGS. 10A and 10B are schematic views showing the main part of an image projection apparatus (liquid crystal video projector) using a zoom lens according to the fourth numerical embodiment of the present invention. FIGS. 11 and 12 are aberration diagrams at the wide angle end and telephoto end with an object distance of 2.8 m when the numerical values in the fourth numerical embodiment (to be described later) of the present invention are expressed in mm.

Figure 13:
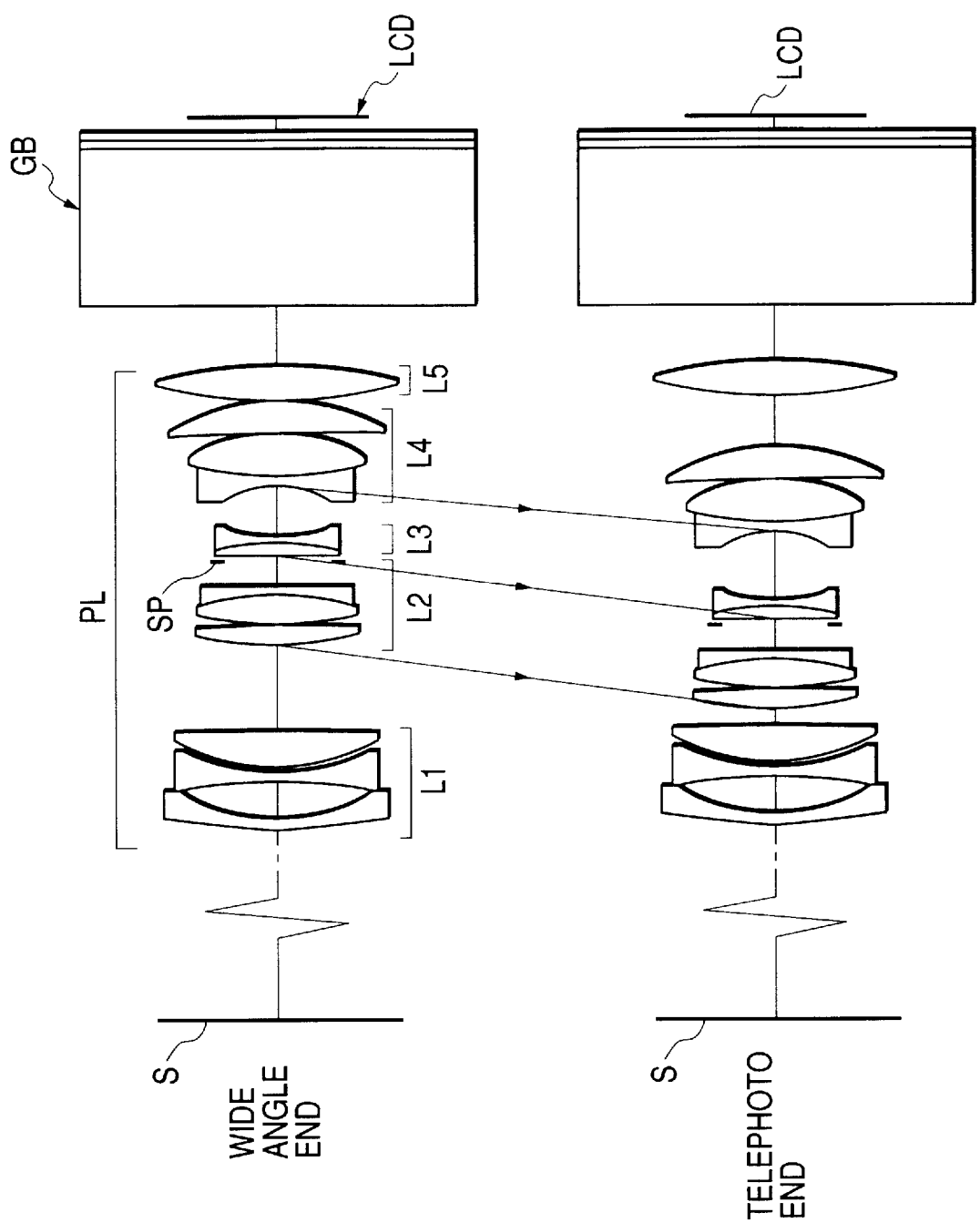
FIGS. 13A and 13B are schematic views showing the main part of an image projection apparatus using a zoom lens according to the fifth numerical embodiment of the present invention.
Figure 14:
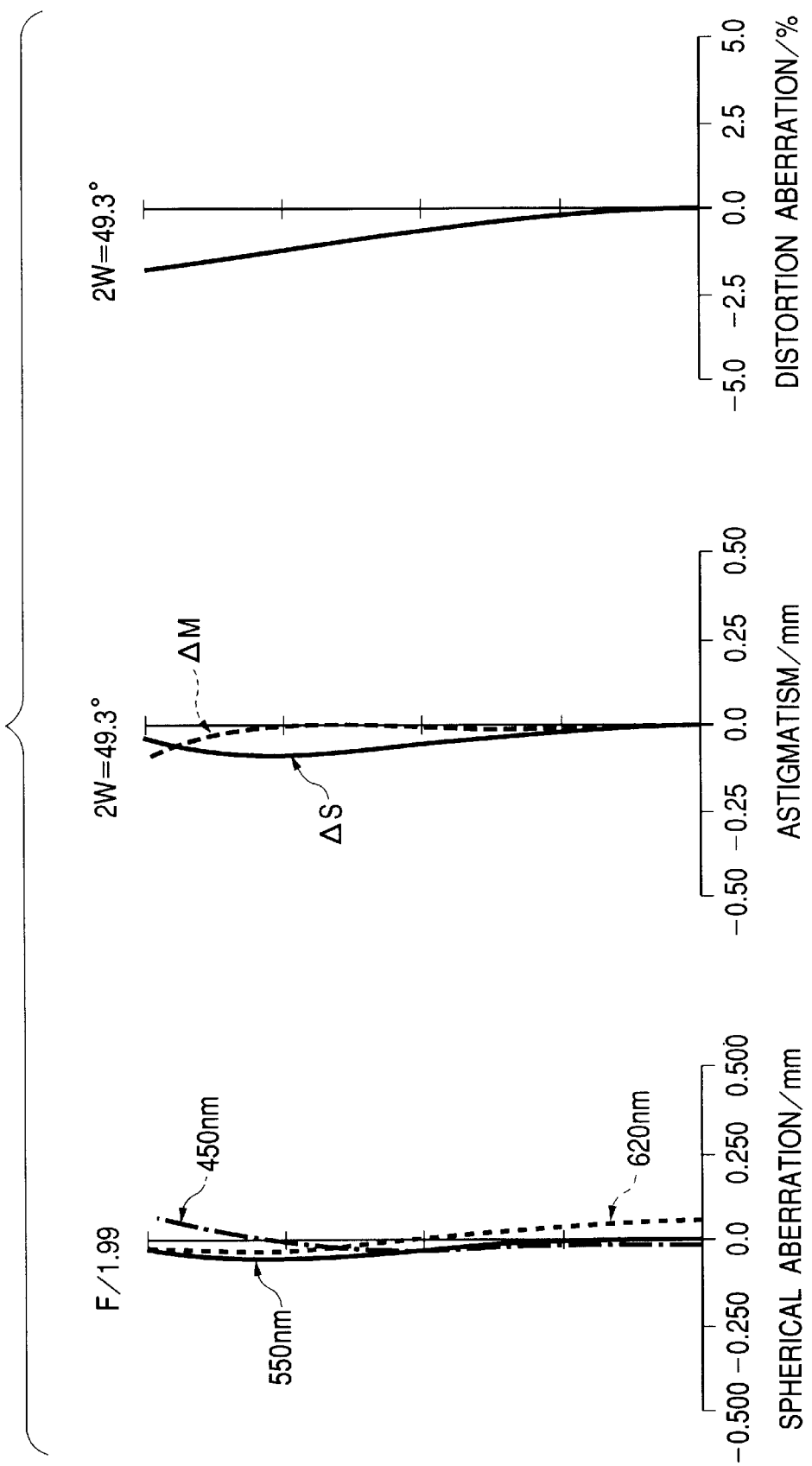
FIG. 14 is an aberration diagram at the wide angle end with an object distance of 2.8 m when the zoom lens of the fifth numerical embodiment of the present invention is expressed in mm.
Figure 15:
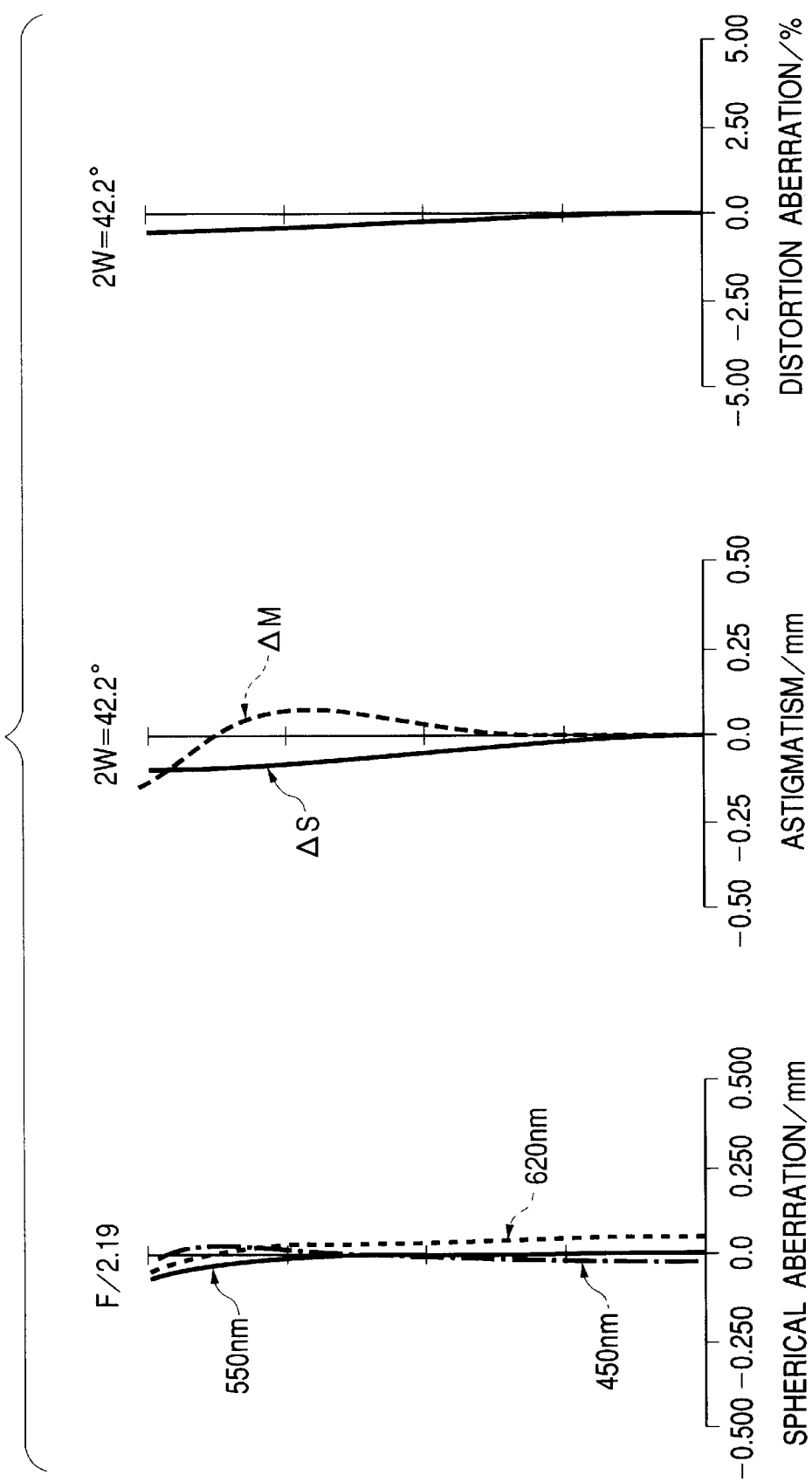
FIG. 15 is an aberration diagram at the telephoto end with an object distance of 2.8 m when the zoom lens of the fifth numerical embodiment of the present invention is expressed in mm.

FIGS. 13A and 13B are schematic views showing the main part of an image projection apparatus (liquid crystal video projector) using a zoom lens according to the fifth numerical embodiment of the present invention. FIGS. 14 and 15 are aberration diagrams at the wide angle end and telephoto end with an object distance of 2.8 m when the numerical values in the fifth numerical embodiment (to be described later) of the present invention are expressed in mm.

In each of the image projection apparatuses according to the first to fifth numerical embodiments, an original image or liquid crystal display is projected on the screen surface by using a zoom lens PL.

Each of FIGS. 1A, 4A, 7A, 10A, and 13A shows the state at the wide angle end. Each of FIGS. 1B, 4B, 7B, 10B, and 13B shows the state at the telephoto end. This apparatus includes the zoom lens PL, a first group (first lens unit) L1 having negative refractive power, a second group (second lens unit) L2 having positive refractive power, a third group (third lens unit) L3 having negative refractive power, a fourth group (fourth lens unit) L4 having negative refractive power, and a fifth group (fifth lens unit) L5 having positive refractive power.

This apparatus has a screen surface (projection surface) S. An original image (projected surface) LCD is an image of a liquid crystal panel (liquid crystal display element). The screen surface S is conjugate to the original image LCD. In general, the screen surface S corresponds to the enlargement side at a conjugate point (first conjugate point) located at a longer distance of conjugate distance, whereas the original image LCD corresponds to the reduction side at a conjugate point (second conjugate point) located at a shorter distance of conjugate distance.

A glass block GB includes a color synthesis prism, polarizing filter, color filter, and the like.

The zoom lens PL is mounted in the liquid crystal video projector body (not shown) through a connection member (not shown). The liquid crystal display element LCD side behind the glass block GB is contained in the projector body.

In each embodiment, when the magnification is to be changed from the wide angle end (FIGS. 1A, 4A, 7A, 10A, and 13A) to the telephoto end (1B, 4B, 7B, 10B, and 13B), the second, third, and fourth groups L2, L3, and L4 are moved to the first conjugate point side (screen surface S side). In zooming operation, particularly, the first and fifth groups are fixed. The first group is moved along the optical axis to perform focusing. Note that focusing may be performed by moving the fifth group or all the groups. Alternatively, focusing may be performed by moving the display panel.

The zoom lens of the present invention has the first lens unit having negative refractive power, the second lens unit having positive refractive power, the third lens unit having negative refractive power, the fourth lens unit having negative refractive power, and the fifth lens unit having positive refractive power which are sequentially arranged from the enlargement side. When the magnification is to be changed from the wide angle end to the telephoto end, the third lens unit is basically moved from the reduction side to the enlargement side.

According to the present invention, a large back focal length is easily ensured by using a retrofocus type having a negative refractive power arrangement on the enlargement side and a positive refractive power arrangement on the reduction side.

The third lens unit acts at an enlargement magnification with respect to the overall system. When the magnification is to be changed from the wide angle end to the telephoto end, the third lens unit moves to the enlargement side to correct an image surface positional offset due to the movement (magnification change) of the second lens unit.

A zoom lens as an object of the present invention is realized by the above arrangement. In consideration of a reduction in the size of the overall lens system, at least one or an arbitrary combination of two or more of the following conditions is preferably satisfied in terms of optical performance (aberration correction):

(B-1) In changing the magnification, both the first and fifth lens units should be fixed with respect to a conjugate point on the reduction side.

The robustness of the projection lens portion is ensured by fixing both the first and fifth lens units with respect to the image surface (LCD) and keeping the total zoom lens length unchanged in changing the magnification. In addition, since the lens units having large apertures are fixed in changing the magnification, the weight balance and the like hardly change. This is advantageous from a mechanical viewpoint.

(B-2) All the second, third and fourth lens units should move to the enlargement side in changing the magnification from the wide angle end to the telephoto end.

This makes it possible to easily ensure a predetermined zoom ratio.

(B-3) The synthetic refractive power of the first to third lens units should have a positive value.

In the present invention, the synthetic refractive power of the first to third lens units is a positive value, and the positive refractive power of a lens unit placed on the reduction side is decreased to reduce the asymmetry of refractive power, thus obtaining good optical performance.

(B-4) Letting β2w be the imaging magnification of the second lens unit at the wide angle end, the following conditional expression should be satisfied:

$$0.25 < -\beta 2w < 1.0 \tag{1}$$

Conditional expression (1) indicates that the second lens unit should be used at a magnification (at the wide angle end) of 100% or less. If this magnification exceeds the lower limit, sufficient back focus cannot be obtained, and the total lens length increases, thus interfering with a reduction in size. In contrast to this, if the magnification exceeds the upper limit, the resultant arrangement is advantageous for a reduction in size, but an aberration variation in magnification changing operation tends to increase.

Note that the numerical value range in conditional expression (1) is preferably set as follows:

$$0.3 < -\beta 2w < 0.9 \tag{1a}$$

(B-5) Letting β3w be the imaging magnification of the third lens unit at the wide angle end, the following conditional expression should be satisfied:

$$1.0 < -\beta 3w < 5.0 \tag{2}$$

Conditional expression (2) also defines the magnification (at the wide angle end) of the third lens unit. If this magnification exceeds the lower limit, the refractive power of the third lens unit decreases. As the Petzval's sum increases, the curvature of field increases. As a result, for example, a desired back focal length cannot be ensured. In contrast to this, if the magnification exceeds the upper limit, the refractive power of the negative lens unit excessively increases to produce an excessively large back focus space. This is not preferable in terms of a reduction in apparatus size.

The numerical value range in conditional expression (2) is set as follows more preferably:

$$1.2 < \beta 3w < 3.0 \tag{2a}$$

(B-6) The zoom lens should include at least one aspherical lens.

In order to make the overall lens system compact, the zoom lens preferably includes at least one aspherical lens to correct aberrations caused as the refractive power of each constituent lens increases.

Although a glass mold type lens, replica aspherical lens, or the like is preferably selected, a plastic aspherical lens may be selected depending on a target resolution and the sensitivity (if it is low.) of the aspherical lens.

(B-7) The zoom lens should include at least one optical element made of a material with an Abbe number of 80 or more.

The use of at least one optical element made of a material with an Abbe number of 80 or more makes it easy to properly correct the chromatic aberration (blue aberration of magnification on the visible short wavelength side, in particular) that is caused as the refractive power of each lens unit increases with a reduction in size.

(B-8) The zoom lens should include a stop that is interposed between the second lens unit and the third lens unit and moves independently or together with the second or third lens unit when the magnification is changed.

This arrangement facilitates correction of an aberration variation accompanying magnification changing operation.

This stop may be set independently. In consideration of conditions in the manufacture, e.g., adding a cam groove in magnification changing operation, the stop may be placed in a magnification changing lens unit such as the second or third lens unit. This makes it possible to efficiently correct an aberration variation in magnification changing operation.

(B-9) The fourth lens unit should include at least one negative lens having two concave lens surfaces and at least two positive lenses which are sequentially arranged from the enlargement side.

The fourth lens unit placed on the reduction side when viewed from the stop is comprised of at least one negative lens having two concave lens surfaces and at least two positive lenses which are sequentially arranged from the enlargement side. In this arrangement, the Petzval's sum is suppressed small by placing a lens having strong negative refractive power at a position where the on-axis light beam height is low. In addition, positive lenses are preferably made to have good telecentric performance by gently refracting downward a ray that diverges by the negative lens unit placed on the reduction side when viewed from the stop. For this purpose, the zoom lens preferably has at least two positive lenses, which are preferably made of a material having a high refractive index to minimize the Petzval's sum.

(B-10) Letting fw be the focal length of the overall system at the wide angle end, and f5 be the focal length of the fifth lens unit, the following conditional expression should be satisfied:

$$1.2 < f5/fw < 2.2 \tag{3}$$

By adding the fifth lens unit near the image surface, the synthetic refractive power of the first to fourth lens units is weakened, and an advantageous effect is produced in increasing the field angle and aperture. Below the lower limit defined by conditional expression (3), the refractive power of the fifth lens unit excessively increases, resulting in increases in distortion, internal coma flare, and the like. Beyond the upper limit, the refractive power of the fifth lens unit excessively decreases, and the effect of weakening the refractive power of the first to fourth lens units decreases. Therefore, the effect of enhancing the optical performance undesirably decreases. In addition, a lens made of a material having a high refractive index is preferably used.

It is more preferable that the numerical value range of conditional expression (3) be set as follows $$1.3 < f5/fw < 1.8 \tag{3a}$$

(B-11) Focusing should be performed by moving the first lens unit along the optical axis.

A focusing mechanism corresponding to the projection distance on the enlargement side is mainly formed by the first lens unit to realize a zoom lens with a simplest mechanism.

(B-12) To reduce an aberration variation in magnification changing operation, the fourth lens unit should be moved along the moving direction of the stop, i.e., to the enlargement side, and preferably has the function of correcting the imaging position in magnification changing operation.

All the second to fourth lens units are preferably moved to the enlargement side in changing the magnification from the wide angle end to the telephoto end by sharing the magnification among the respective lens units.

In addition to the basic arrangement described above, the zoom lens of the present invention should include (C1) a first lens unit having negative refractive power, a second lens unit having positive refractive power, a third lens unit having negative refractive power, a fourth lens unit having negative refractive power, and a fifth lens unit having positive refractive power which are sequentially arranged from the enlargement side. In changing the magnification from the wide angle end to the telephoto end, the first and fifth lens units are fixed, and all the second, third, and fourth lens units are moved from the reduction side to the enlargement side. Letting β2w and β3w be the imaging magnifications of the second and third lens units at the wide angle end, f5 be the focal length of the fifth lens unit, and fw be the focal length of the overall system at the wide angle end.

$$0.25 < -\beta 2w < 1.0 \tag{1}$$

$$1.0 < -\beta 3w < 5.0 \tag{2}$$

$$1.2 < f5/fw < 2.2 \tag{3}$$

A desired zoom lens can also be obtained by satisfying the above conditions.

In addition the numeral value ranges defined by conditional expressions (1) to (3) may be set as indicated by conditional expressions (1a) to (3a).

The technical meanings of conditional expressions (1) to (3) are the same as those described above.

(C-2) It is more preferable that the zoom lens include a stop that is interposed between the second lens unit and the third lens unit and moves independently or together with the second or third lens unit when the magnification is changed. Focusing is preferably performed by moving the first lens unit.

According to the zoom lens of the present invention, the synthetic refractive powers on the enlargement side and reduction side of the stop are positive refractive powers. This eliminates the necessity to have a lens unit having strong refractive power. That is, this arrangement is advantageous in terms of aberration correction.

The detailed arrangement of each embodiment of the present invention will be described next.

(First Embodiment)

This embodiment is comprised of five lens units respectively having negative refractive power, position refractive power, negative refractive power, negative refractive power, and positive refractive power sequentially arranged from the object side.

When the magnification is to changed from the wide angle end to the telephoto end, the first and fifth lens units are fixed, and hence the total length remains the same. The second to fourth lens units independently move to the enlargement side. To ensure proper illuminance on the screen, each lens surface is formed by a multilayer coat. These arrangements remain the same in the subsequent embodiments.

The internal arrangement of the first lens unit includes three lenses, i.e., a negative lens, negative lens, and positive lens sequentially arranged from the enlargement side. This arrangement can be realized by designing the lens on the enlargement side to have a small lens aperture. Since the principal plane is located near the enlargement side, the magnification of the second lens unit can be reduced within the range of desired specifications, thus producing a merit in terms of aberration correction.

The second lens unit serves as a main magnification changing lens unit and hence is given high refracting power. For this reason, the positive lens is made of a glass material with a high refractive index, thereby decreasing the Petzval's sum and an aberration variation such as spherical aberration in magnification changing operation. If a large-aperture lens and a fast response at a high spatial frequency are required, the permissible circle of confusion (blur) decreases, and the depth of focus decreases accordingly. Since the sense of resolution abruptly deteriorates as the curvature of field and astigmatism increase at an intermediate image height and the like, a material having a high refractive index is used to decrease the Petzval's sum.

To properly correct a chromatic aberration of magnification in a wide visible region as well, a lanthanum-based heavy flint glass material having abnormal dispersion properties is used for the positive lens, thus reducing color blurring. As the second lens unit responsible for this magnification changing operation, a lens having a reverse reduction magnification of −0.56 to −0.65 throughout the entire magnification change range is used.

When the magnification is to be changed from the wide angle end to the telephoto end, the third lens unit moves to the enlargement side. This lens unit exhibits an enlargement magnification of 1.35 to 1.38 throughout the entire magnification change range, and is moved to the enlargement side to exhibit a slight multiplication effect and correct an image surface positional offset due to magnification changing operation of the second lens unit. Note that a stop exists in the third lens unit and moves together with the third lens unit in magnification changing operation, thus suppressing off-axis aberration variations during magnification changing operation.

The fourth lens unit serves to correct an image surface positional offset due to magnification changing operation.

In this embodiment, this lens unit is comprised of one negative lens having two concave lens surfaces and two positive lenses. Strong negative refractive power is given to the lens located nearest the enlargement side. This strong negative refractive power helps to efficiently reduce the Petzval's sum. In addition, since the principal plane can be located on the liquid crystal display apparatus side, this arrangement provides advantages in ensuring good telecentric performance with respect to the pupil and ensuring a long back focal length.

The fourth lens unit exhibits a magnification of 100% or more throughout the entire magnification change range, and moves to the enlargement side, like the second and third lens units.

The fifth lens unit is formed by a single positive lens and fixed in changing the magnification from the wide angle end to the telephoto end. This lens unit allows the first to fourth lens units to be designed to have low refractive power.

Note that the aberration diagrams in this embodiment are aberration diagrams at the wide angle end and telephoto end when the retrofocus type zoom lens of this embodiment is focused to an object distance of 2.8 m through the first lens unit. The same applies to the following embodiments.

(Second Embodiment)

In this embodiment, the second lens unit is comprised of three lenses, i.e., negative, positive, and positive lenses, unlike in the first embodiment. High refractive power can be gained by the large principal plane separation between the first and second lens units, and the working magnification of the second lens unit is set to be low.

Other points are the same as those in the first embodiment, and hence a detailed description thereof will be omitted.

(Third Embodiment)

In this embodiment, the first lens unit is comprised of positive, negative, and negative lenses, with the positive lens being located nearest the enlargement side. This arrangement efficiently corrects mainly distortion aberration unique to a retrofocus type lens by adding slight positive refractive power. For this reason, the negative refractive power of the first lens unit is higher than that in the first embodiment or the like, and hence the moving amount of the first lens unit in focusing decreases. This makes it possible to easily suppress aberration variations due to focusing.

The arrangement of the first lens unit gives the second lens unit high refractive power as compared with the first embodiment. The second lens unit is therefore comprised of three positive lenses having high refractive indexes so as to minimize the occurrence of aberration. Owing the arrangement of the first lens unit as well, the second lens unit exhibits a high magnification as compared with the first embodiment. In this embodiment, a stop exists in the second lens unit, and moves together with the second lens unit, thus suppressing off-axis aberration variations during magnification changing operation.

The third lens unit is formed by a single negative lens. In this embodiment, this lens unit mainly serves to correct an image surface positional offset due to magnification changing operation of the second lens unit.

Other points are the same as those in the first embodiment, and hence a detailed description thereof will be omitted.

(Fourth Embodiment)

This embodiment greatly differs from the first embodiment in that an aspherical surface is used, and the refractive power of the second lens unit is increased to increase the zoom ratio. In order to suppress an aberration variation in magnification changing operation, in particular, an aspherical surface is used for a positive lens of the second lens unit which is located nearest the enlargement side. In this case, a glass mold type aspherical surface is used. However, the present invention is not limited to this. A replica type aspherical surface free from a restriction on the type of glass material may be used. Note that a stop exists in the second lens unit, and moves together with the second lens unit in magnification changing operation, thus suppressing off-axis aberration variations during magnification changing operation.

Other points are the same as those in the first embodiment, and hence a detailed description thereof will be omitted.

(Fifth Embodiment)

This embodiment realizes a larger field angle than the first embodiment. This embodiment mainly corrects distortion aberration unique to a retrofocus type lens due to an increase in field angle by using aspherical surfaces for the negative lens, of the first lens unit, which is located on the enlargement side and the lenses of the fifth lens unit one by one. In this case as well, glass mold type aspherical surfaces are used. However, the present invention is not limited to this, and replica type aspherical surfaces may be used.

As for the refractive power arrangement, the refractive power of the second lens unit is higher than that in the first embodiment, and the working magnification of the second lens unit is lower than that in the first embodiment, thereby realizing an increase in field angle. Note that a stop exists in the second lens unit, and moves together with the second lens unit in magnification changing operation, thus suppressing off-axis aberration variations during magnification changing operation.

For the joint positive lenses of the fourth lens unit, FK01 (trade name) is used to properly correct chromatic aberration of magnification in the visible blue light region, in particular. This reduces blue color blurring and flare at a peripheral portion of an image. In a liquid crystal projector, in particular, a light beam near the pupil center needs to have high intensity and be sufficiently corrected up to a mercury purple emission line spectrum. In this embodiment, this correction is properly performed.

Other points are almost the same as those in the first embodiment, and hence a detailed description thereof will be omitted.

The numerical embodiments of the present invention will be described next. In each numerical embodiment, let Ri be the radius of curvature of the ith surface from the screen side, and Di be the refractive index and Abbe number of a material for the ith optical member from the screen side.

Letting R be the radius of curvature of the central portion of a lens surface, the X-axis be the optical axis direction (the traveling direction of light), the Y-axis be a direction perpendicular to the optical axis, and B, C, D, and E be aspherical coefficients, an aspherical shape is expressed by $$X = \frac{(1/R)\,Y^2}{1+\sqrt{1-(1+K)(Y/R)^2}} + AY^4 + BY^6 + CY^8$$

Note that "e-X" represents "$\times 10^{-x}$".

Table 1 shows the relationship between the above conditional expressions and the numerical values in the respective numerical embodiments.

Lens spec & data
f: 37.4 mm–44.5 mm  FNO: 2.00–2.17

|  | r | d | n | ν |
|---|---|---|---|---|
| 1 | 124.237 | 1.60 | 1.528 | 63.1 |
| 2 | 23.946 | 6.20 |  |  |
| 3 | −112.008 | 1.50 | 1.487 | 70.2 |
| 4 | 48.761 | 0.20 |  |  |
| 5 | 36.585 | 4.24 | 1.771 | 44.2 |
| 6 | 373.156 | ( ) |  |  |
| 7 | 78.882 | 1.60 | 1.805 | 24.9 |
| 8 | 42.607 | 0.15 |  |  |
| 9 | 44.911 | 3.63 | 1.820 | 39.4 |
| 10 | −308.409 | 0.15 |  |  |
| 11 | 42.044 | 4.12 | 1.773 | 49.6 |
| 12 | −140.819 | 0.14 |  |  |
| 13 | −131.098 | 1.35 | 1.847 | 23.8 |
| 14 | 246.280 | ( ) |  |  |
| 15 | 79.720 | 2.65 | 1.821 | 38.2 |
| 16 | −57.863 | 0.15 |  |  |
| 17 | −69.638 | 0.95 | 1.548 | 46.4 |
| 18 | 22.874 | ( ) |  |  |
| 19 | −16.860 | 1.54 | 1.728 | 28.7 |
| 20 | 58.490 | 8.52 | 1.487 | 70.2 |
| 21 | −24.000 | 0.15 |  |  |
| 22 | −2251.194 | 5.03 | 1.658 | 50.9 |
| 23 | −43.328 | ( ) |  |  |
| 24 | 87.194 | 6.02 | 1.741 | 44.9 |
| 25 | −83.121 | ( ) |  |  |
| 26 | inf. | 26.00 | 1.516 | 64.1 |
| 27 | inf. | 0.00 |  |  |
| 28 | inf. | 0.80 | 1.760 | 55.0 |
| 29 | inf. | 0.00 |  |  |
| 30 | inf. | 0.20 | 1.500 | 65.0 |
| 31 | inf. | 0.00 |  |  |
| 32 | inf. | 2.30 | 1.490 | 65.0 |
| 33 | inf. |  |  |  |

| zoom data | | |
|---|---|---|
|  | W | T |
| d6 | 10.34 | 0.96 |
| d14 | 9.61 | 10.37 |
| d18 | 8.78 | 9.93 |
| d23 | 0.50 | 7.97 |
| d25 | 10.50 | 10.50 |

Lens spec & data
f: 37.3 mm–44.4 mm FNO: 2.00–2.18

|    | r        | d     | n     | ν    |
|----|----------|-------|-------|------|
| 1  | 157.395  | 1.60  | 1.589 | 56.1 |
| 2  | 25.163   | 6.08  |       |      |
| 3  | −102.498 | 1.50  | 1.487 | 70.2 |
| 4  | 56.881   | 0.20  |       |      |
| 5  | 39.594   | 4.31  | 1.783 | 43.0 |
| 6  | 2573.684 | (   ) |       |      |
| 7  | 69.320   | 1.50  | 1.847 | 23.8 |
| 8  | 34.035   | 0.15  |       |      |
| 9  | 35.637   | 4.48  | 1.773 | 49.6 |
| 10 | −190.134 | 0.15  |       |      |
| 11 | 39.481   | 3.02  | 1.834 | 37.2 |
| 12 | 104.382  | (   ) |       |      |
| 13 | 57.105   | 3.01  | 1.785 | 41.5 |
| 14 | −55.552  | 0.15  |       |      |
| 15 | −64.241  | 0.95  | 1.589 | 39.1 |
| 16 | 21.557   | (   ) |       |      |
| 17 | −16.800  | 1.54  | 1.727 | 29.0 |
| 18 | 71.163   | 8.34  | 1.487 | 70.2 |
| 19 | −24.000  | 0.15  |       |      |
| 20 | −355.073 | 5.00  | 1.658 | 50.9 |
| 21 | −39.798  | (   ) |       |      |
| 22 | 82.703   | 6.07  | 1.744 | 44.8 |
| 23 | −88.273  | (   ) |       |      |
| 24 | inf.     | 26.00 | 1.516 | 64.1 |
| 25 | inf.     | 0.00  |       |      |
| 26 | inf.     | 0.80  | 1.760 | 55.0 |
| 27 | inf.     | 0.00  |       |      |
| 28 | inf.     | 0.20  | 1.500 | 65.0 |
| 29 | inf.     | 0.00  |       |      |
| 30 | inf.     | 2.30  | 1.490 | 65.0 |
| 31 | inf.     |       |       |      | zoom data

|     | W     | T     |
|-----|-------|-------|
| d6  | 10.37 | 0.97  |
| d12 | 10.04 | 10.73 |
| d16 | 10.02 | 11.47 |
| d21 | 0.50  | 7.76  |
| d23 | 10.50 | 10.50 |

Lens spec & data
f: 36.8 mm–47.4 mm FNO: 2.34–2.76

|    | r        | d     | n     | ν    |
|----|----------|-------|-------|------|
| 1  | 150.040  | 2.36  | 1.834 | 37.2 |
| 2  | −696.122 | 0.15  |       |      |
| 3  | 82.762   | 1.50  | 1.487 | 70.2 |
| 4  | 20.236   | 8.31  |       |      |
| 5  | −38.521  | 1.30  | 1.581 | 55.2 |
| 6  | −616.553 | (   ) |       |      |
| 7  | 60.301   | 3.59  | 1.834 | 37.2 |
| 8  | −86.150  | 3.50  |       |      |
| 9  | 45.137   | 5.25  | 1.596 | 59.4 |
| 10 | −28.384  | 1.10  | 1.840 | 28.7 |
| 11 | −99.310  | 9.19  |       |      |
| 12 | −59.230  | 1.61  | 1.773 | 49.6 |
| 13 | −32.257  | (   ) |       |      |
| 14 | −332.636 | 0.85  | 1.487 | 70.2 |
| 15 | 27.666   | (   ) |       |      |
| 16 | −15.568  | 1.54  | 1.728 | 28.5 |
| 17 | 52.406   | 8.34  | 1.487 | 70.2 |
| 18 | −24.550  | 0.15  |       |      |

-continued

Lens spec & data
f: 36.8 mm–47.4 mm FNO: 2.34–2.76

|    | r        | d     | n     | ν    |
|----|----------|-------|-------|------|
| 19 | −168.986 | 4.63  | 1.720 | 43.7 |
| 20 | −37.428  | (   ) |       |      |
| 21 | 72.965   | 7.06  | 1.720 | 43.7 |
| 22 | −77.213  | (   ) |       |      |
| 23 | inf.     | 32.00 | 1.516 | 64.1 |
| 24 | inf.     | 0.00  |       |      |
| 25 | inf.     | 0.80  | 1.520 | 65.0 |
| 26 | inf.     | 0.00  |       |      |
| 27 | inf.     | 1.70  | 1.520 | 65.0 |
| 28 | inf.     | 0.00  |       |      |
| 29 | inf.     | 0.50  | 1.520 | 65.0 |
| 30 | inf.     |       |       |      | zoom data

|     | W     | T     |
|-----|-------|-------|
| d6  | 8.71  | 1.22  |
| d13 | 0.90  | 7.13  |
| d15 | 9.35  | 6.97  |
| d20 | 0.60  | 4.24  |
| d22 | 12.00 | 12.00 |

Lens spec & data
f: 34.8 mm–44.9 mm FNO: 2.05–2.36

|    | r        | d     | n     | ν    |
|----|----------|-------|-------|------|
| 1  | 92.123   | 1.60  | 1.582 | 50.0 |
| 2  | 23.735   | 6.86  |       |      |
| 3  | −78.978  | 1.50  | 1.487 | 70.2 |
| 4  | 54.486   | 0.27  |       |      |
| 5  | 39.218   | 4.03  | 1.806 | 40.9 |
| 6  | 570.446  | (   ) |       |      |
| 7  | (   )    | 3.21  | 1.785 | 45.1 |
| 8  | −202.415 | 0.15  |       |      |
| 9  | 53.569   | 5.08  | 1.827 | 38.2 |
| 10 | −42.304  | 1.35  | 1.847 | 23.9 |
| 11 | 908.451  | (   ) |       |      |
| 12 | 320.798  | 2.24  | 1.834 | 37.2 |
| 13 | −62.162  | 0.15  |       |      |
| 14 | 353.026  | 0.95  | 1.587 | 39.4 |
| 15 | 21.684   | (   ) |       |      |
| 16 | −16.600  | 1.54  | 1.728 | 28.5 |
| 17 | 62.664   | 9.28  | 1.487 | 70.2 |
| 18 | −24.650  | 0.15  |       |      |
| 19 | −243.406 | 4.56  | 1.658 | 50.9 |
| 20 | −38.017  | (   ) |       |      |
| 21 | 83.906   | 5.69  | 1.744 | 44.8 |
| 22 | −85.397  | (   ) |       |      |
| 23 | inf.     | 27.00 | 1.516 | 64.1 |
| 24 | inf.     | 0.00  |       |      |
| 25 | inf.     | 0.20  | 1.500 | 65.0 |
| 26 | inf.     | 0.00  |       |      |
| 27 | inf.     | 1.10  | 1.520 | 65.0 |
| 28 | inf.     | 0.00  |       |      |
| 29 | inf.     | 1.20  | 1.460 | 65.0 |
| 30 | inf.     |       |       |      |

| zoom data | | |
|---|---|---|
| | W | T |
| d6 | 14.21 | 1.04 |
| d11 | 8.75 | 9.51 |
| d15 | 8.20 | 10.41 |
| d20 | 0.50 | 10.70 |
| d22 | 10.50 | 10.50 |

| ASP data | | | | |
|---|---|---|---|---|
| c(1/r) | k | A | B | C |
| 7 1.432e−02 | −3.263e+00 | −9.545e−07 | 5.148e−11 | −1.920e−12 |

Lens spec & data
f: 33.5 mm–39.9 mm FNO: 1.99–2.19

| | r | d | n | ν |
|---|---|---|---|---|
| 1 | 150.000 | 1.60 | 1.583 | 59.4 |
| 2 | ( ) | 6.35 | | |
| 3 | −146.792 | 1.50 | 1.505 | 67.8 |
| 4 | 39.089 | 0.71 | | |
| 5 | 36.117 | 6.60 | 1.742 | 46.4 |
| 6 | −308.034 | ( ) | | |
| 7 | 54.151 | 3.34 | 1.792 | 44.7 |
| 8 | −1194.333 | 0.29 | | |
| 9 | 45.392 | 5.32 | 1.797 | 41.1 |

-continued

Lens spec & data
f: 33.5 mm–39.9 mm FNO: 1.99–2.19

| | r | d | n | ν |
|---|---|---|---|---|
| 10 | −37.206 | 1.35 | 1.847 | 23.9 |
| 11 | 395.048 | ( ) | | |
| 12 | −342.912 | 2.40 | 1.847 | 23.9 |
| 13 | −38.953 | 0.95 | 1.564 | 46.7 |
| 14 | 25.682 | ( ) | | |
| 15 | −18.197 | 1.45 | 1.728 | 28.5 |
| 16 | 53.613 | 7.16 | 1.497 | 81.5 |
| 17 | −27.615 | 0.15 | | |
| 18 | −731.896 | 5.03 | 1.607 | 56.7 |
| 19 | −34.720 | ( ) | | |
| 20 | ( ) | 5.99 | 1.743 | 49.3 |
| 21 | −71.438 | ( ) | | |
| 22 | inf. | 27.00 | 1.516 | 64.1 |
| 23 | inf. | 0.00 | | |
| 24 | inf. | 0.20 | 1.500 | 65.0 |
| 25 | inf. | 0.00 | | |
| 26 | inf. | 1.10 | 1.520 | 65.0 |
| 27 | inf. | 0.00 | | |
| 28 | inf. | 1.20 | 1.460 | 65.0 |
| 29 | inf. | | | |

| zoom data | | |
|---|---|---|
| | W | T |
| d6 | 14.12 | 2.58 |
| d11 | 5.19 | 5.20 |
| d14 | 9.13 | 12.03 |
| d19 | 0.51 | 9.14 |
| d21 | 10.50 | 10.50 |

| ASP data | | | | | | |
|---|---|---|---|---|---|---|
| | c(1/r) | k | A | B | C | D |
| 2 | 3.769e − 02 | −5.131e − 02 | −7.419e − 07 | 1.503e − 09 | −1.677e − 11 | 3.728e − 14 |
| 20 | 1.309e − 02 | −2.598e + 00 | −6.262e − 07 | −8.072e − 10 | 5.038e − 12 | −6.997e − 15 |

TABLE 1

| | Conditional Expression | | |
|---|---|---|---|
| Numerical Embodiment | (1) - β2w | (2) - β3w | (1) f5/fw |
| 1 | 0.56 | 1.35 | 1.55 |
| 2 | 0.55 | 1.41 | 1.55 |
| 3 | 0.78 | 2.26 | 1.44 |
| 4 | 0.49 | 1.45 | 1.65 |
| 5 | 0.32 | 2.31 | 1.5 |

As has been described above, according to each embodiment of the present invention, a compact retrofocus type zoom lens is realized, which has good telecentric performance on the reduction side, and properly corrects chromatic aberration of magnification in a wide visible region with high resolution and low distortion.

Figure 16:
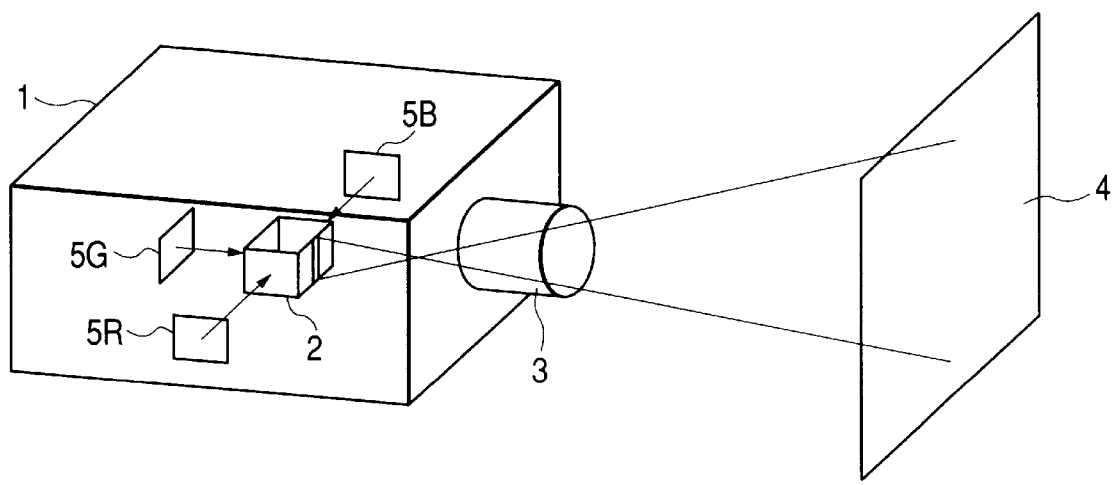
FIG. 16 is a schematic view showing the main part of an embodiment in which the image projection apparatus according to the present invention is applied to a color liquid crystal projector.

FIG. 16 is a schematic view showing the main part of an embodiment of an image projection apparatus according to the present invention.

FIG. 16 shows the image projection apparatus obtained by applying the above zoom lens to a three-panel color liquid crystal projector, which synthesizes pieces of image information of a plurality of color light beams based on a plurality of liquid crystal display elements through a color synthesis means, and enlarges or projects the resultant image on a screen surface through a projection lens. Referring to FIG. 16, a color liquid crystal projector 1 synthesizes R, G, and B light beams from R, G, and B liquid crystal panels 5B, 5G, and 5B into one optical path through a prism 2 serving as a color synthesis means, and projects the resultant image on a screen 4 by using a projection lens 3 formed by the zoom lens described above.

Figure 17:
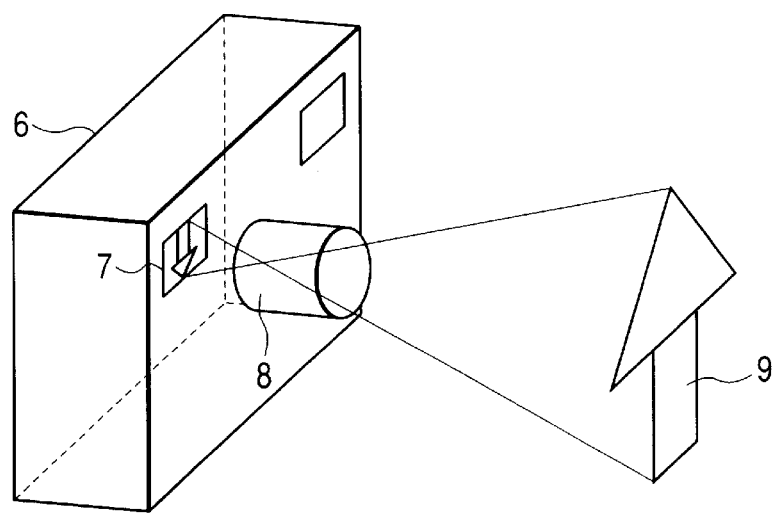
FIG. 17 is a schematic view showing the main part of an embodiment of an optical device according to the present invention.

FIG. 17 is a schematic view showing the main part of an embodiment of an optical device according to the present invention. In this embodiment, as an optical device including an image pickup apparatus such as a video camera, film camera, or digital camera, a device using the above zoom lens as a phototaking lens.

Referring to FIG. 17, an image of an object 9 is formed on a photosensitive member 7 through a phototaking lens 8 to obtain image information.

As described above, the zoom lens and image projection apparatus of this embodiment maintain good telecentric performance throughout the entire magnification change range while attaining a reduction in the size of the overall lens system, properly correct aberrations accompanying magnification changing operation, and have good optical performance through the entire screen.

What is claimed is:

1. A zoom lens comprising:
   a first lens unit having negative refractive power;
   a second lens unit having positive refractive power;
   a third lens unit having negative refractive power;
   a fourth lens unit having negative refractive power;
   a fifth lens unit having positive refractive power, said first to fifth lens units being sequentially arranged from an enlargement side, each of said lens units having one or a plurality of lenses, and
   a stop provided between lenses included within said second and third lens units,
   wherein when magnification is changed from wide angle end to telephoto end, intervals between said first to fifth lens units are changed, and
   wherein both refractive power on the enlargement side from said stop and refractive power on a reduction side from said stop are positive.

2. A lens according to claim 1, wherein said third lens unit moves from the reduction side to the enlargement side when a magnification is changed from a wide angle end to a telephoto end.

3. A lens according to claim 1, wherein said second and fourth lens units move from the reduction side to the enlargement side when the magnification is changed from the wide angle end to the telephoto end.

4. A lens according to claim 1, wherein both said first and fifth lens units are fixed with respect to a conjugate point on the reduction side in magnification changing operation.

5. A lens according to claim 1, wherein letting $\beta2w$ be an imaging magnification of said second lens unit at the wide angle end, a conditional expression, $$0.25 < -\beta2w < 1.0$$

is satisfied.

6. A lens according to claim 1, wherein letting $\beta3w$ be an imaging magnification of said third lens unit at the wide angle end, a conditional expression, $$1.0 < \beta3w < 5.0$$

is satisfied.

7. A lens according to claim 1, further comprising at least one aspherical lens.

8. A lens according to claim 1, further comprising at least one optical element made of a material having an Abbe number of not less than 80.

9. A lens according to claim 1, wherein said stop moves independently or together with said second or third lens unit in magnification changing operation.

10. A lens according to claim 1, wherein said fourth lens unit includes at least one negative lens having two concave surfaces and at least two positive lenses which are sequentially arranged from the enlargement side.

11. A lens according to claim 1, wherein letting fw be a focal length of an overall system at the wide angle end, and f5 be a focal length of said fifth lens unit, a conditional expression, $$1.2 < f5/fw < 2.2$$

is satisfied.

12. A lens according to claim 1, wherein focusing is performed by moving said first lens unit along an optical axis.

13. An image projection apparatus comprising:
    at least one image display element; and
    said zoom lens defined by claim 1, which projects an original projection image formed by said image display element onto a projection screen.

14. An optical device for forming image information on image pickup means by using said zoom lens defined by claim 1.

15. A zoom lens comprising:
    a first lens unit having negative refractive power;
    a second lens unit having positive refractive power;
    a third lens unit having negative refractive power;
    a fourth lens unit having negative refractive power; and
    a fifth lens unit having positive refractive power, said first to fifth lens units being sequentially arranged from an enlargement side, each of said lens units having one or a plurality of lenses,
    wherein when a magnification is changed from a wide angle end to a telephoto end, said first and fifth lens units are fixed, all said second, third, and fourth lens units move from a reduction side to the enlargement side, and letting $\beta2w$ and $\beta3w$ be imaging magnifications of said second and third lens units at the wide angle end, f5 be a focal length of said fifth lens unit, and fw be a focal length of an overall system at the wide angle end, $$0.25 < -\beta2w < 1.0$$

$$1.0 < \beta3w < 5.0$$

$$1.2 < f5/fw < 2.2$$

are satisfied.

16. A lens according to claim 15, wherein said zoom lens includes a stop between said second lens unit and said third lens unit, which moves independently or together with said second or third lens unit in magnification changing operation, and focusing is performed by moving said first lens unit.

17. An image projection apparatus comprising:

at least one image display element; and said zoom lens defined by claim 15, which projects an original projection image formed by said image display element onto a projection screen.

18. An optical device for forming image information on image pickup means by using said zoom lens defined by claim 15.

19. A zoom lens according to claim 15, further comprising a stop provided between lenses included within said second and third lens units.

20. A zoom lens according to claim 19, wherein both refractive power on the enlargement side from said stop and refractive power on the reduction side from said stop are positive.

21. A zoom lens according to claim 19, wherein said stop moves independently or together with said second or third lens unit in magnification changing operation.

22. A zoom lens according to claim 15, further comprising at least one aspherical lens.

23. A zoom lens according to claim 15, further comprising at least one optical element made of a material having an Abbe number of not less than 80.

24. A zoom lens according to claim 15, wherein said fourth lens unit includes at least one negative lens having two concave surfaces and at least two positive lenses which are sequentially arranged from the enlargement side.

25. A zoom lens according to claim 15, wherein focusing is performed by moving said first lens unit along an optical axis.

26. A zoom lens comprising:

a first lens unit having negative refractive power;

a second lens unit having positive refractive power;

a third lens unit having negative refractive power;

a fourth lens unit having negative refractive power; and a fifth lens unit having positive refractive power, said first to fifth lens units being sequentially arranged from an enlargement side, each of said lens units having one or a plurality of lenses, wherein when magnification is changed from wide angle end to telephoto end, intervals between said first to fifth lens units are changed, and wherein letting f5 be a focal length of said fifth lens unit at the wide angle end, and fw be a focal length of an overall system at the wide angle end, a conditional expression, 1.2<f5/fw<2.2 is satisfied.

27. A zoom lens according to claim 26, further comprising a stop provided between lenses included within said second and third lens units.

28. A zoom lens according to claim 27, wherein both refractive power on the enlargement side from said stop and refractive power on a reduction side from said stop are positive.

29. A zoom lens according to claim 27, wherein said stop moves independently or together with said second or third lens unit in magnification changing operation.

30. A zoom lens according to claim 26, wherein said third lens unit moves from a reduction side to the enlargement side when the magnification is changed from the wide angle end to the telephoto end.

31. A zoom lens according to claim 26, wherein said second and fourth lens units move from a reduction side to the enlargement side when the magnification is changed from the wide angle end to the telephoto end.

32. A zoom lens according to claim 26, wherein both said first and fifth lens units are fixed with respect to a conjugate point on a reduction side in magnification changing operation.

33. A zoom lens according to claim 26, further comprising at least one aspherical lens.

34. A zoom lens according to claim 26, further comprising at least one optical element made of a material having an Abbe number of not less than 80.

35. A zoom lens according to claim 26, wherein said fourth lens unit includes at least one negative lens having two concave surfaces and at least two positive lenses which are sequentially arranged from the enlargement side.

36. A zoom lens according to claim 26, wherein focusing is performed by moving said first lens unit along an optical axis.

37. An image projection apparatus comprising:

at least one image display element; and a zoom lens defined by claim 26, which projects an original projection image formed by said image display element onto a projection screen.

38. An optical device for forming image information on image pickup means by using a zoom lens defined by claim 26.

* * * * *